(12) United States Patent
Hasegawa et al.

(10) Patent No.: US 8,792,037 B2
(45) Date of Patent: Jul. 29, 2014

(54) SOLID-STATE IMAGING DEVICE AND METHOD OF DRIVING THE SAME WHERE THREE LEVELS OF POTENTIALS INCLUDING A NEGATIVE POTENTIAL ARE APPLIED IN THE TRANSFER GATE

(75) Inventors: Hikaru Hasegawa, Shiga (JP); Yasuyuki Endoh, Hyogo (JP); Nobukazu Teranishi, Kyoto (JP)

(73) Assignee: Panasonic Corporation, Kadoma-Shi, Osaka (JP)

( * ) Notice: Subject to any disclaimer, the term of this patent is extended or adjusted under 35 U.S.C. 154(b) by 0 days.

(21) Appl. No.: 13/590,670

(22) Filed: Aug. 21, 2012

(65) Prior Publication Data
US 2012/0320245 A1 Dec. 20, 2012

Related U.S. Application Data

(63) Continuation of application No. PCT/JP2010/006730, filed on Nov. 17, 2010.

(30) Foreign Application Priority Data

Feb. 26, 2010 (JP) .................................. 2010-043289

(51) Int. Cl.
  *H04N 5/335* (2011.01)
  *H04N 3/14* (2006.01)
(52) U.S. Cl.
  USPC .......................................... 348/308; 348/311
(58) Field of Classification Search
  USPC ........................................ 348/294, 302, 308
  See application file for complete search history.

(56) References Cited

U.S. PATENT DOCUMENTS 7,554,074 B2   6/2009   Mheen et al.
7,839,441 B2  11/2010   Watanabe
(Continued)

FOREIGN PATENT DOCUMENTS

JP   2006-042120 A   2/2006
JP   2007-166240 A   6/2007
(Continued)

OTHER PUBLICATIONS

International Search Report mailed Dec. 14, 2010 issued in corresponding International application No. PCT/JP2010/006730.
(Continued)

*Primary Examiner* — Sinh Tran
*Assistant Examiner* — Shahbaz Nazrul
(74) *Attorney, Agent, or Firm* — McDermott Will & Emery LLP

(57) ABSTRACT

A row scanning unit is configured to change a potential of a transfer signal from a second potential V2 to a third potential V3 prior to driving of a transfer operation for causing a transfer of signal charges from a photodiode to a floating diffusion, by supplying a transfer pulse having a first potential V1. The first potential V1 is a positive potential for turning a transfer transistor into ON state, the second potential V2 is a potential for causing pinning of holes under a gate of the transfer transistor and turning the transfer transistor into OFF state, and the third potential V3 is a potential for not causing the pinning of the holes under the gate of the transfer transistor and turning the transfer transistor into OFF state, the third potential being lower than the first potential and higher than the second potential.

12 Claims, 18 Drawing Sheets

(56) References Cited

U.S. PATENT DOCUMENTS

| | | | |
|---|---|---|---|
| 2004/0051801 A1* | 3/2004 | Iizuka et al. | 348/294 |
| 2006/0023096 A1 | 2/2006 | Watanabe | |
| 2007/0064138 A1* | 3/2007 | Wada | 348/311 |
| 2008/0093534 A1 | 4/2008 | Mheen et al. | |
| 2009/0251582 A1* | 10/2009 | Oike | 348/308 |
| 2011/0211103 A1 | 9/2011 | Sakano et al. | |
| 2011/0242379 A1* | 10/2011 | Kato et al. | 348/300 |
| 2012/0033119 A1* | 2/2012 | Shinohara | 348/302 |
| 2012/0154657 A1* | 6/2012 | Itonaga | 348/308 |

FOREIGN PATENT DOCUMENTS

| | | |
|---|---|---|
| JP | 2008-104186 A | 5/2008 |
| JP | 2009-268083 A | 11/2009 |
| JP | 2011-199816 A | 10/2011 |

OTHER PUBLICATIONS

Japanese Office Action issued in corresponding Japanese Application No. 2010-043289, dated Dec. 24, 2013.

* cited by examiner

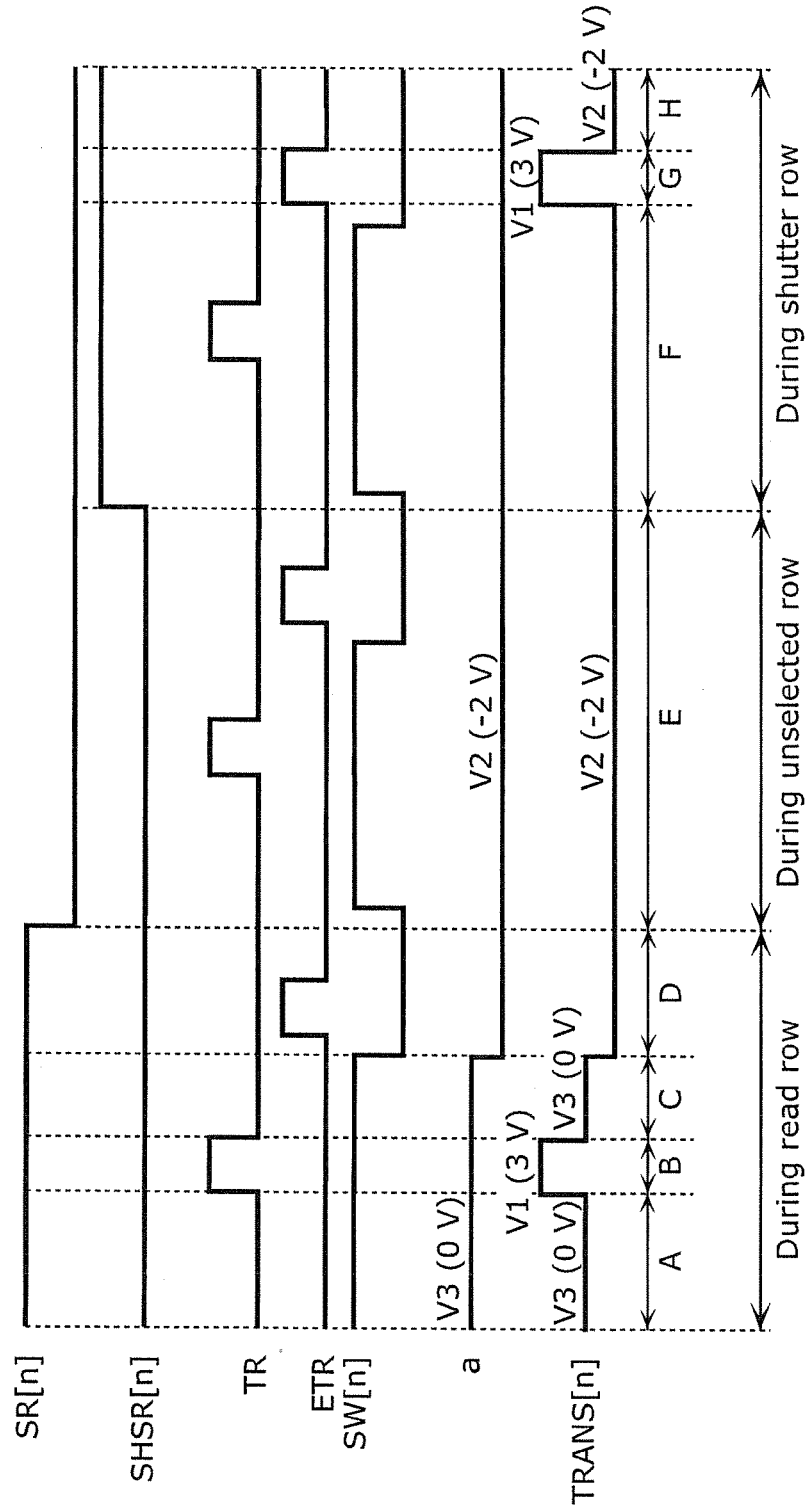

(a) During transferTr-OFF (b) Application of transferTr gate intermediate potential (0 V)

(c) During transferTr-ON

SOLID-STATE IMAGING DEVICE AND METHOD OF DRIVING THE SAME WHERE THREE LEVELS OF POTENTIALS INCLUDING A NEGATIVE POTENTIAL ARE APPLIED IN THE TRANSFER GATE

CROSS REFERENCE TO RELATED APPLICATION

This is a continuation application of PCT Patent Application No. PCT/JP2010/006730 filed on Nov. 17, 2010, designating the United States of America, which is based on and claims priority of Japanese Patent Application No. 2010-043289 filed on Feb. 26, 2010. The entire disclosures of the above-identified applications, including the specifications, drawings and claims are incorporated herein by reference in their entirety.

TECHNICAL FIELD

The present invention relates to solid-state imaging devices, methods of driving the same, and imaging devices in which the solid-state imaging devices are used as imaging devices.

BACKGROUND ART

FIG. 14 shows a solid-state imaging device in a conventional technique disclosed in Patent Literature (PTL) 1. The solid-state imaging device includes a photodiode (PD) 104, a transfer transistor 105, a floating diffusion (FD) 107, a reset transistor 106, and an amplifying transistor 108. In the technique disclosed in PTL 1, in a reading operation, the FD is first reset to a high potential, and light signal charges detected by the PD are transferred to the FD by applying a positive potential to a gate of the transfer transistor 105 and by turning the transfer transistor 105 into ON state, whereby an FD potential varies depending on a charge amount, and the potential variation of the FD is outputted as pixel signals.

PTL 1 also discloses a technique to suppress an influence to a pixel signal from a leak current due to gate induced drain leakage (GIDL), by using a transfer transistor of which a gate electrode is driven by three value potentials, and especially by applying an intermediate potential, which is a negative potential, simultaneously with or prior to a fall of a reset pulse which drives the reset transistor, since in the course of the further miniaturization in devices, intensity of a field placed to a border of P-well and N+ layer is increased, which causes the leak current at a border with the FD due to GIDL and causes noise.

CITATION LIST

Patent Literature

[PTL1] Japanese Unexamined Patent Application Publication No. 2007-166240

SUMMARY OF INVENTION

Technical Problem

However, in the conventional technique disclosed in PTL 1, when charges are trapped by traps before trapping charges which are near an interface under a gate of a MOS, the charges become a noise source. Especially, in a case where holes are trapped by the traps under the gate of the transfer transistor, when the signal charges are transferred from the photodiode (PD) to the floating diffusion (FD), the signal charges recouple with the holes which have been trapped by the traps in a transfer channel. Therefore, the signal charges are lost which causes (i) deterioration in low-light-intensity linearity due to insufficient output in a low-light-intensity situation and (ii) generation of roughness due to the variation in the amount of recoupling among each pixel, both of which cause deterioration in image quality.

The present invention relates to a solid-state imaging device, a camera, and a method of driving the same which reduce deterioration in image quality caused by recoupling of signal charges and holes trapped by traps directly under a gate of a transfer transistor.

Solution to Problem

A solid-state imaging device which achieves the above object includes: a plurality of unit cells arranged in rows and columns; and a row scanning unit configured to generate a reset signal and a transfer signal for driving row scanning of the unit cells, wherein each of the unit cells includes: a photodiode which converts incident light into signal charges; a floating diffusion which holds the signal charges; a transfer transistor which transfers the signal charges from the photodiode to the floating diffusion according to the transfer signal; a reset transistor which resets a potential of the floating diffusion according to the reset signal; and an amplifying transistor which converts the signal charges accumulated in the floating diffusion into voltage, the row scanning unit is configured to change a potential of the transfer signal from a second potential to a third potential prior to driving of a transfer operation for causing a transfer of the signal charges from the photodiode to the floating diffusion, by supplying a transfer pulse having a first potential, the first potential is a positive potential for turning the transfer transistor into ON state, the second potential is a potential for causing pinning of holes under a gate of the transfer transistor and turning the transfer transistor into OFF state, and the third potential is a potential for not causing the pinning of the holes under the gate of the transfer transistor and turning the transfer transistor into OFF state, the third potential being lower than the first potential and higher than the second potential.

With this configuration, the potential of the transfer signal is changed from the second potential (V2) to the third potential (V3), so that the holes trapped by traps near an interface under the gate of the transfer transistor are emitted. In the transfer operation, loss of the signal charges due to recouping of the holes and the signal charges as described above can be reduced. Thus, an advantageous effect is provided that deterioration in image quality is reduced.

Here, the second potential may be a negative potential and the third potential may be a ground potential.

Here, each of the unit cells may be connected to the amplifying transistor and may include a selection transistor which selects whether or not to output the voltage converted by the amplifying transistor to a column signal line.

Here, the third potential may be equal to a potential of a well area in which the transfer transistor is formed.

Here, the row scanning unit may change the potential of the transfer signal from the second potential to the third potential prior to a reset operation to reset the potential of the floating diffusion according to the reset signal.

If the potential of the transfer signal is changed from the second potential to the third potential during a time after the reset operation and before the transfer operation, the holes trapped by the traps near the interface under the gate may be emitted to the floating diffusion and the holes may become a noise source against a reset level.

With the above configuration, however, the noise against the reset level can be reduced since the holes trapped by the traps near the interface under the gate are emitted prior to the reset operation.

Here, it is desirable that timing for changing the potential of the transfer signal from the second potential to the third potential is in a minimum time which satisfies that a time after the change until the start of the reset operation is longer than a time constant during which the holes are emitted by the third potential.

Here, the row scanning unit may change the potential of the transfer signal from the second potential to the third potential a predetermined time prior to a start of the reset operation, and the predetermined time may be longer than a time constant indicating a time required to emit the holes from traps under the gate of the transfer transistor.

With this configuration, a sufficient amount of holes can be accurately emitted by setting the gate of the transfer transistor at the third potential for a time longer than the time constant in which the trapped holes are emitted from the traps. Therefore, the charge loss due to recoupling is reduced more accurately.

Furthermore, when the time constant during which the trapped holes are emitted from the traps is longer than the driving time of an n-th row, the gate of the transfer transistor of the n-th row is set at the third potential from an n−1-th row so that the sufficient amount of holes can be accurately emitted. Therefore, the charge loss due to recoupling is reduced more accurately. Thus, it is possible to improve the image quality mainly during a time with low light intensity.

Here, the solid-state imaging device may further include a sample and hold unit configured to sample and hold, for every column of the unit cells, the voltage outputted from the amplifying transistor. The row scanning unit may hold the second potential from a completion of the transfer operation to a completion of the sample and hold, and change the potential of the transfer signal from the second potential to the third potential after the completion of the sample and hold.

With this configuration, a signal is maintained to be in a same phase as the reset signal by maintaining the state of the floating diffusion during read-time in the same state as in the reset operation. Therefore, it is expected that the noise content unique to the semiconductor element is eliminated.

Here, the solid-state imaging device may further include an AD conversion unit configured to perform analog-to-digital (AD) conversion, for every column of the unit cells, on the voltage outputted from the amplifying transistor, wherein the row scanning unit is configured to hold the second potential from the completion of the transfer operation to the completion of the AD conversion, and to change the potential of the transfer signal from the second potential to the third potential after the completion of the AD conversion.

With this configuration, a signal is maintained to be in a same phase as the reset signal by maintaining the state of the floating diffusion during read-time in the same state as in the reset operation. Therefore, it is expected that the noise content unique to the semiconductor element is eliminated.

Here, a method of driving the solid-state imaging device which achieves the above object includes: changing a potential of the transfer signal from a second potential to a third potential in the row scanning; and supplying a transfer pulse having a first potential for causing a transfer of the signal charges from the photodiode to the floating diffusion in the row scanning.

Furthermore, a camera which achieves the above object includes the above solid-state imaging device.

Advantageous Effects of Invention

With the present invention, an advantageous effect is provided that the deterioration in image quality, which is caused by recoupling of the signal charges and the holes which are trapped by the traps directly under the gate of the transfer transistor and are emitted during driving the reading, is reduced by emitting the trapped holes using the third potential.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 2B shows a configuration example and a driving timing chart of the vertical scanning buffer according to Embodiment 1 of the present invention.

DESCRIPTION OF EMBODIMENTS

[Embodiment 1]

Figure 1:
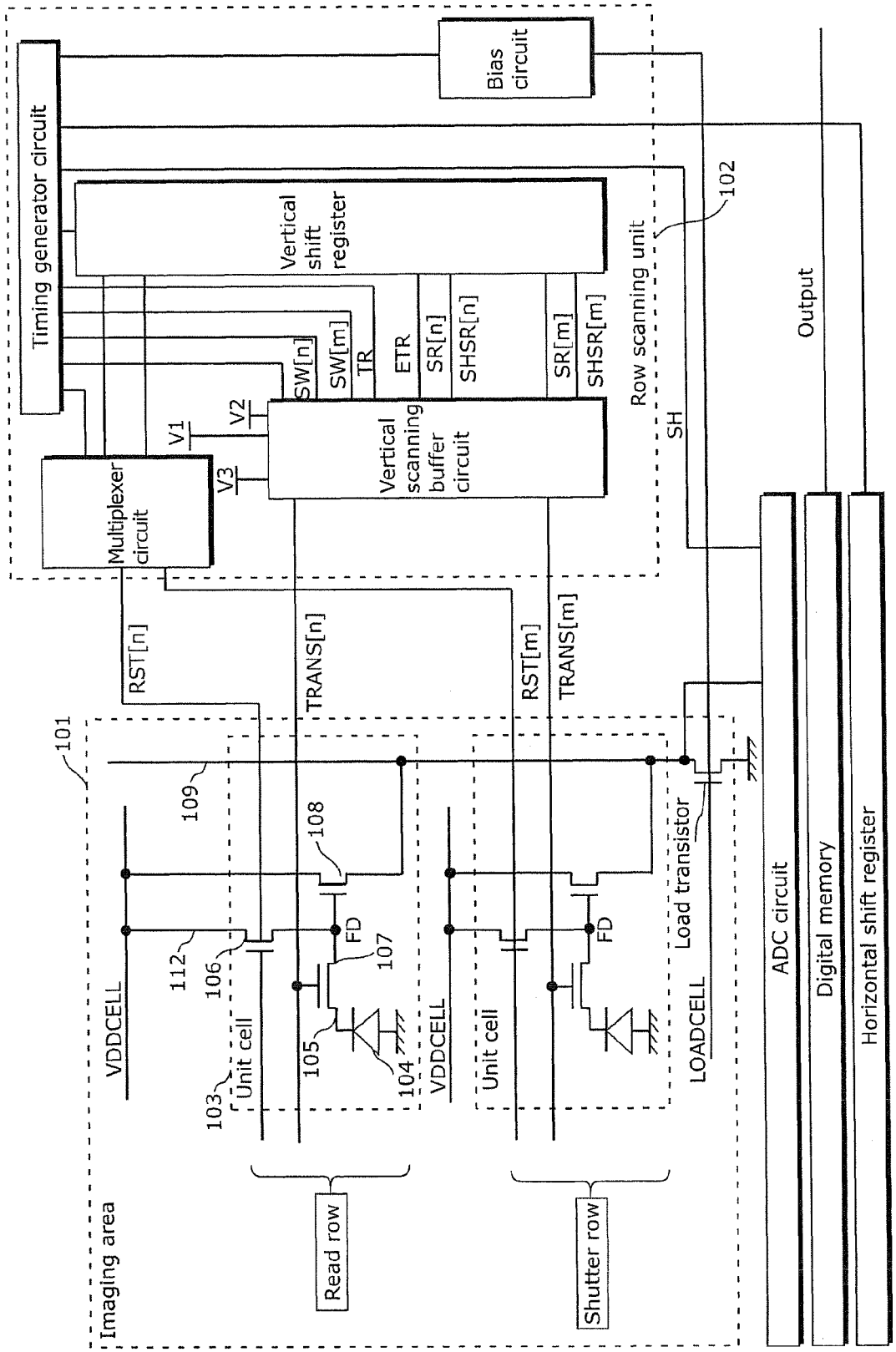
FIG. 1 shows a solid-state imaging device according to Embodiment 1 of the present invention.

First, an outline of the solid-state imaging device in Embodiment 1 according to an aspect of the present invention is described. The solid-state imaging device in the present embodiment includes: a plurality of unit cells 103 arranged in rows and columns; and a row scanning unit 102 configured to generate a reset signal and a transfer signal for driving row scanning of the unit cells.

Each of the unit cells 103 includes: a photodiode (PD) 104 which converts incident light into signal charges; a floating diffusion (FD) 107 which holds the signal charges; a transfer transistor 105 which transfers the signal charges from the photodiode to the floating diffusion according to the transfer signal; a reset transistor 106 which resets a potential of the floating diffusion according to the reset signal; and an amplifying transistor 108 which converts the signal charges accumulated in the floating diffusion into voltage.

The row scanning unit 102 has a feature that the row scanning unit 102 is configured to change a potential of the transfer signal from a second potential (V2) to a third potential (V3) prior to driving of a transfer operation for causing a transfer of the signal charges from the photodiode to the floating diffusion, by supplying a transfer pulse having a first potential (V1). Here, the first potential is a positive potential for turning the transfer transistor 105 into ON state. The second potential is a potential for causing pinning of holes under a gate of the transfer transistor 105 and turning the transfer transistor 105 into OFF state. The third potential is a potential for not causing the pinning of the holes under the gate of the transfer transistor 105 and turning the transfer transistor 105 into OFF state, the third potential being lower than the first potential and higher than the second potential.

With this configuration, the potential of the transfer signal is changed from the second potential (V2) to the third potential (V3), so that the holes trapped by traps near an interface under the gate of the transfer transistor are emitted. In the transfer operation, loss of the signal charges due to recouping of the holes and the signal charges as described above can be reduced. Thus, an advantageous effect is provided that deterioration in image quality is reduced.

The following describes the solid-state imaging device according to the present embodiment with reference to the drawings.

FIG. 1 shows a configuration diagram of the solid-state imaging device according to the present invention.

As shown in FIG. 1, the solid-state imaging device includes, on a semiconductor substrate, an imaging area 101 in which a plurality of unit cells 103 are arranged two-dimensionally. Each of the unit cells 103 includes: a photodiode (PD) 104; a transfer transistor 105 which reads a signal from the photodiode (PD) 104; a reset transistor 106 for resetting the signal; an amplifying transistor 108, a column signal line 109; a drain line (VDDCELL) 112; and a floating diffusion (FD) 107 in which charges of the photodiode (PD) 104 are read and accumulated.

An anode of the photodiode (PD) 104 which generates light signal charges is grounded, and the cathode is connected to the floating diffusion (FD) 107 via the transfer transistor 105. The floating diffusion (FD) 107 is connected to one of electrodes of the reset transistor 106 for resetting the signal and to a gate of the amplifying transistor 108 for outputting the light signal charges as voltage. The other of the electrodes of the reset transistor 106 and the drain of the amplifying transistor 108 are connected to the drain line (VDDCELL) 112. The drain line (VDDCELL) 112 is connected to other unit cells in common, and to a timing generator circuit. A source of the amplifying transistor 108 is connected to the column signal line 109 wired in a vertical direction.

The column signal line 109 is connected to other unit cells disposed in the same column in the same manner, and to one of the electrodes of a load transistor. The other of the electrodes of the load transistor is grounded, and the gate is connected to a load gate line (LOADCELL) which is wired in a horizontal direction.

A gate of the transfer transistor 105 is connected to a transfer gate line (TRANS) 110 wired in a horizontal direction, and a gate of the reset transistor 106 is connected to a reset line (RST) 111 wired in a horizontal direction.

The reset line (RST) 111 is connected to other unit cells disposed in the same row in the same manner, and to a multiplexer circuit, and a signal voltage is supplied based on driving timing described later. Meanwhile, the transfer gate line (TRANS) 110 is connected to the vertical scanning buffer circuit. In the same manner as in the multiplexer circuit, the transfer gate line (TRANS) 110 is connected to other unit cells disposed in the same row, and the signal voltage is supplied based on the driving timing described later.

Furthermore, as shown in FIG. 1, a vertical shift register operates at timing of driving the vertical shift register transmitted from the timing generator circuit and a signal outputted by the vertical shift register and a signal transmitted from the timing generator circuit are inputted to the multiplexer circuit, whereby an appropriate pulse which drives a reset transistor 106 is applied to each row via the reset line (RST) 111. Furthermore, the signal outputted by the vertical shift register, a transfer timing signal (TR) and a potential switching signal (SW) which are transmitted from the timing generator circuit are inputted to the vertical scanning buffer circuit, whereby appropriate transfer pulses to be applied to the gate of the transfer transistor 105 in a read row and the gate of the transfer transistor 105 in a shutter row are generated.

The vertical scanning buffer circuit supplies a signal voltage having three value potentials to the transfer pulse. Furthermore, the transfer pulses of three values includes two values including a positive potential for turning on the transfer transistor 105 (first potential, for example 3 V) and a negative potential for turning off the transfer transistor 105 (second potential, for example −2 V). Thus, a negative potential is applied when turning off the transfer transistor 105 so that a dark current or a white scratch can be prevented.

Moreover, the solid-state imaging device according to the present embodiment has a feature that the solid-state imaging device is driven using: the first potential for turning the transfer transistor 105 into ON state (positive potential, for example 3 V); the second potential for turning the transfer transistor 105 into OFF state (negative potential, for example −2 V); and, as the third potential, a potential which is not the negative potential (0 V, for example) for not causing the pinning of the holes under the gate of the transfer transistor. This operation is described in detail later.

Furthermore, also in a case where the gate potential of the transfer transistor 105 is equal to the well potential of the transfer transistor 105, the pinning of holes in not caused near the interface under the gate and the transfer transistor 105 is OFF. Therefore, using the potential equal to the well as the third potential is also effective.

With the above driving, the signal is read from the unit cells 103 through the column signal line 109 of the unit cell 103 in each line. The read signal for each pixel is removed with noise signals and further converted to a digital value. Then, the horizontal shift register is driven at the timing for driving the horizontal shift register that is transmitted from the timing generator circuit, a signal of each pixel in the ADC circuit is recorded in the digital memory, and the signal is outputted from the digital memory to outside the imaging device. Although FIG. 1 shows a pixel array having two rows and one column for simplifying the description, the array is not determined by this size.

It is to be noted that the solid-state imaging device shown in FIG. 1 may be configured as unit cells using a selection transistor (see selection transistor 8E in FIG. 4) which is similar to the one disclosed in PTL 1, in addition to the configuration with the above-described unit cells.

Figure 4:
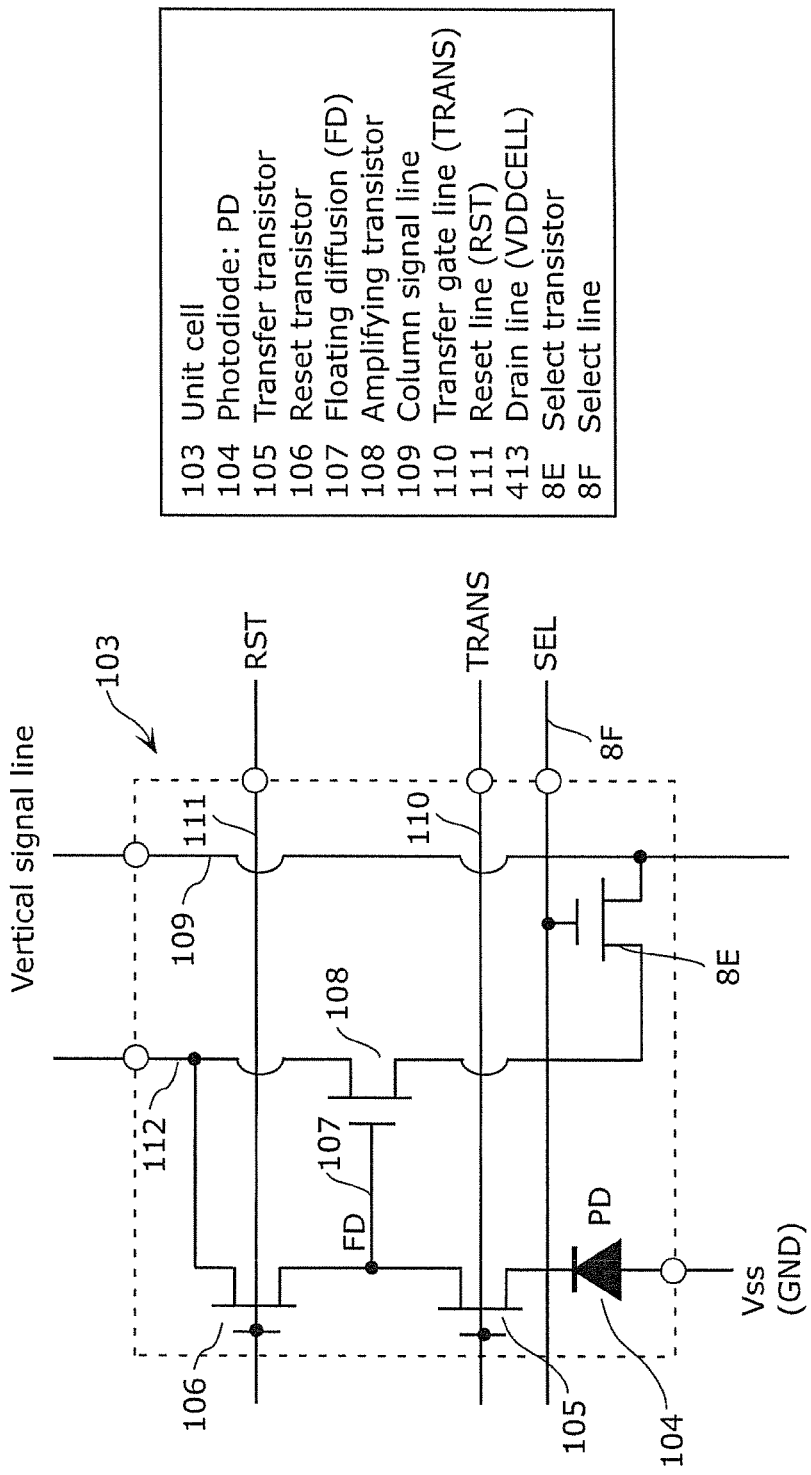
FIG. 4 shows the solid-state imaging device according to embodiments of the present invention.

Furthermore, the solid-state imaging device shown in FIG. 1 and FIG. 4 may be achieved using a structure of so-called a back-surface irradiation type image sensor (back-surface irradiation type solid-state imaging device), in which pixels are formed on a back surface, that is on the back side of the surface on which the gate terminal and the wiring of the transistor are formed, of a semiconductor substrate, in addition to the structure in which pixels are formed on a front surface, that is the same surface as the surface on which the gate terminal and the wiring of the transistor are formed, of a semiconductor substrate.

Figure 2A:
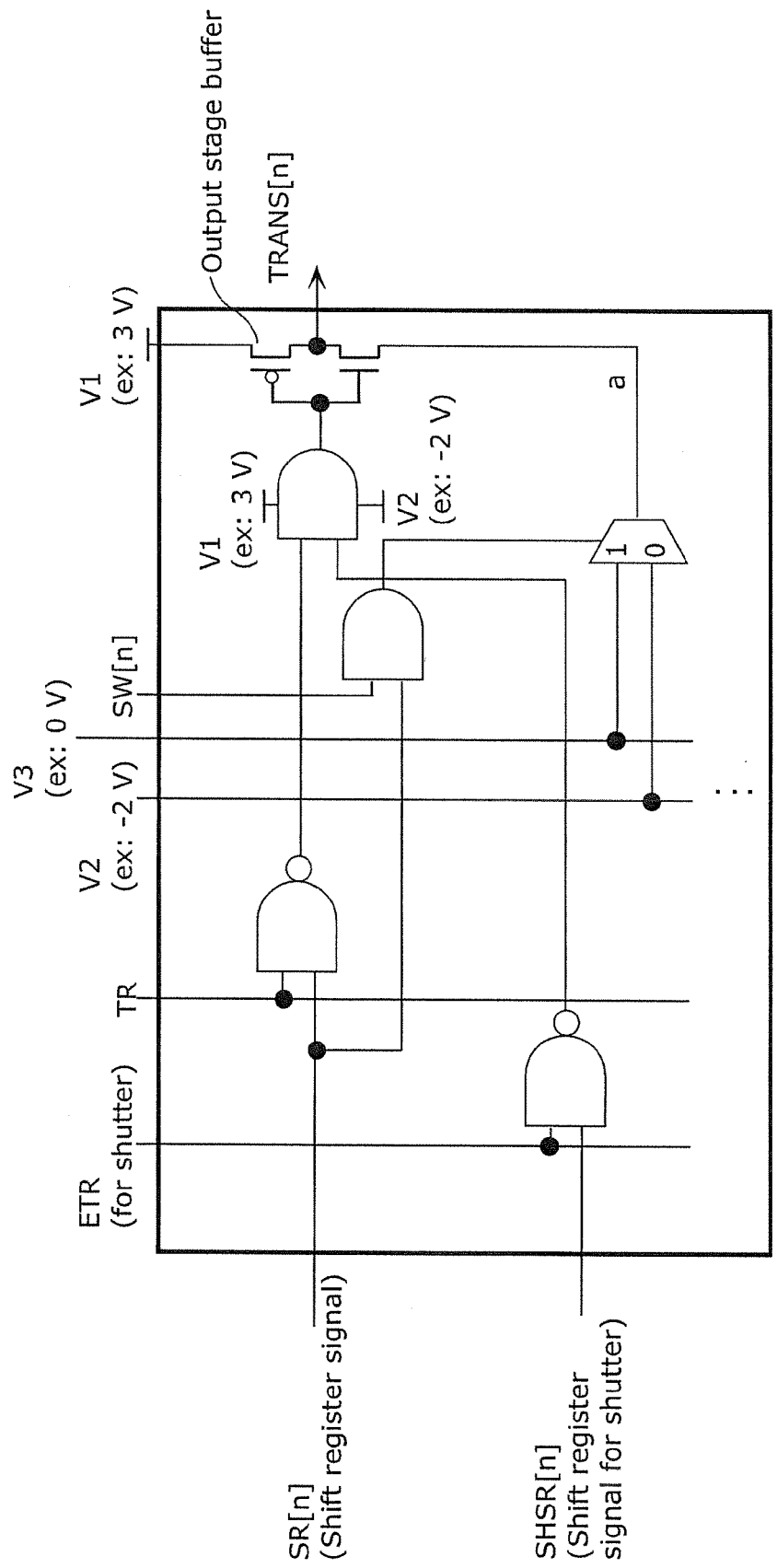
FIG. 2A shows a configuration example of a unit circuit which corresponds to a row in a vertical scanning buffer circuit in Embodiment 1 of the present invention.

Next, the details on the solid-state imaging device according to the present embodiment, namely the details on the vertical scanning buffer circuit, is described using FIG. 2A and FIG. 2B. FIG. 2A shows an example of the vertical scanning buffer circuit in the present embodiment.

As shown in FIG. 2A, three types of voltages are applied to the vertical scanning buffer circuit. Namely, a first potential which is a positive potential (3 V, for example), a second potential which is a negative potential (−2 V, for example), and a third potential (0 V, for example) are applied. Since the potential 3 is 0 V in the present embodiment, there are advantages such as the potential of the transfer signal can be easily supplied by grounding and a circuit such as a buck circuit is not required. The signals to be inputted are a shift register signal (SR[n]), a shift register signal for shutter (SHSR[n]), a transfer timing signal (TR), a transfer timing signal during shuttered period (ETR), and a potential switching signal (SW[n]). It is to be noted that as shown in FIG. 1, the shift register signal (SR[n]) and the shift register signal for shutter (SHSR[n]) are connected with the shift register. A high-level signal is inputted to SR[n] when the row is the read row, and the SHSR[n] is applied when the row is the shutter row.

The potential switching signal (SW[n]), the transfer timing signal (TR), and the transfer timing signal during shuttered period (ETR) are connected to the timing generator circuit, and are driven at timing as described below and are inputted to the vertical scanning buffer.

The output of the vertical scanning buffer circuit is connected with the transfer gate line (TRANS[n]) 110 connected to the gate of the transfer transistor 105, and outputted as the transfer driving pulse.

Furthermore, FIG. 2B shows a driving (operation) of the vertical scanning buffer circuit. Since SR[n] is high-level and SHSR[n] is low-level in Periods A to D, the row is the read row. At this time, a high-level signal is inputted to SW[n]. Furthermore, when the transfer timing signal (TR) is low-level, a high-level potential (3 V) is applied to the gate of the output stage buffer in the circuit diagram in FIG. 2A, which turns on the N-ch MOS in the output stage buffer. At this time, the multiplexer applies 0 V to the source (wiring a) of the N-ch type MOS in the output stage buffer.

As a result, 0 V is outputted to TRANS[n] (Period A, FIG. 2B). This is the third potential in the driving of the transfer transistor 105 with three-value potentials described above.

Next, when the transfer timing signal (TR) turns into high-level, 3 V is outputted to TRANS[n] (Period B in FIG. 2B) since the low-level signal is applied to the gate of the output stage buffer, and the P-ch MOS of the output stage buffer is turned on. This is the first potential described above.

Next, when the transfer timing signal (TR) turns into low-level, 0 V is outputted to TRANS[n] again (Period C, FIG. 2B) since the gate of the output stage buffer turns into high-level. Next, SW[n] turns into low-level, −2 V is applied to the wiring a since the multiplexer is switched, and −2 V is outputted to a transfer gate line (TRANS[n]) (Period D, FIG. 2B). Although ETR turns into high-level during this period, this has no influence on the signals in TRANS[n] (the potential is maintained at −2 V). This is the second potential described above.

In Period E in FIG. 2B, SR[n] is low-level and SHSR[n] is low-level. Therefore, the row is an unselected row, and the transfer pulse which is the output keeps outputting the second potential (−2 V) no matter what signal is inputted.

In Periods F to H in FIG. 2B, SR[n] is low-level and SHSR[n] is high-level. Therefore, the row is a shutter row. Although input signals TR, ETR, and SW[n] are inputted in Period F in FIG. 2B in the same manner as in Periods A to C, the signals in TRANS[n] are not changed (the potential is maintained at −2 V).

Next, when ETR turns into high-level in Period G, a low-level signal is applied to the gate of the output stage buffer and the P-ch MOS of the output stage buffer is turned on. Therefore, the first potential (3 V) is outputted to TRANS[n]. This is the signal charge transfer during shuttered time. When ETR turns into low-level again, the P-ch MOS of the output stage buffer is turned off. Therefore, the second potential (−2 V) is outputted to TRANS[n] (Period H).

Figure 3:
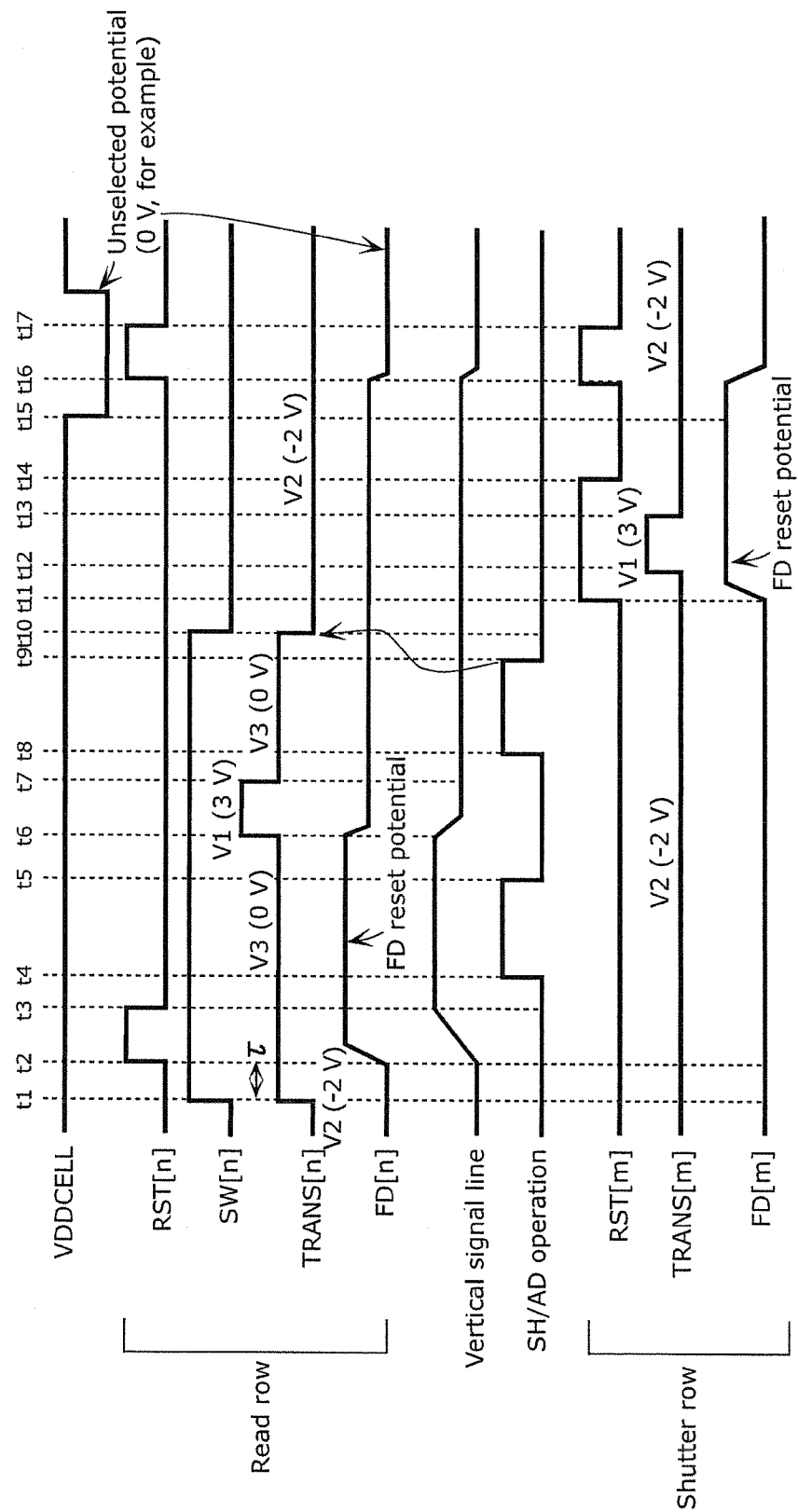
FIG. 3 shows a timing chart which shows a method of driving the solid-state imaging device according to Embodiment 1 of the present invention.

Next, FIG. 3 shows a timing chart which shows an operation of (method of driving) the solid-state imaging device according to the present embodiment.

As shown in FIG. 3, rows other than the read row are in OFF state by an application of a negative potential (−2 V, for example) which is the second potential to the transfer transistor 105. Therefore, holes are induced near the interface under the gate of the transfer transistor 105, and some of the induced holes are trapped by the traps ((a) in FIG. 5). In the read row, the potential switching signal (SW) turns into high-level at timing of t1, and the vertical shift register described above operates to apply 0 V which is the third potential to the gate of the transfer transistor 105. With the effect of the above, the holes trapped by the traps near the interface under the gate of the transfer transistor 105 are started to be emitted.

After that, a high-level signal is applied to the reset line (RST) 111 at t2, to set the potential of the floating diffusion (FD) 107 of the unit cell 103 in the read row at the reset level), and a driving pulse SH is set at high-level during a period from t4 to t5, so that the reset signal is imported in the ADC circuit. At this time, assuming that the time from Period t1 to t2 as τ, it is desirable that this τ is set as the shortest time which satisfies being longer than the time constant during which the holes are emitted from the traps by which the holes are trapped.

Furthermore, by setting τ longer than the time constant, there is no hole remained in the traps near the interface under the gate. Therefore, when applying a positive potential (3 V, for example) which is the first potential to the gate of the transfer transistor 105 during a period from t5 to t6 to turn on the transfer transistor 105 so that the signal charges are transferred from the photodiode (PD) 104 to the floating diffusion (FD) 107 through a channel under the gate of the transfer transistor 105, the signal charges no longer vanish due to recoupling of the holes with the signal charges. With the effect of the above, deterioration in linearity and the roughness is suppressed, and especially, the image quality is improved, during a time with low-light-intensity. Meanwhile, by setting the time τ as short as possible, deterioration in image quality due to a dark current or a white scratch can be suppressed.

After the signal charge transfer at t7 is completed, the third potential (0 V) is maintained to be applied to the gate of the transfer transistor 105. This is for maintaining the state of the floating diffusion (FD) 107 the same as the state during importing the reset signal (period from t4 to t5) so that the signal and the reset signal can be maintained in the same phase. Thus, it is expected that the noise component (variation in vt, etc.) which is unique to the semiconductor element is sufficiently eliminated when executing the difference between the two signals.

After that, the driving pulse SH is set at high-level again during the period from t8 to t9 to import the signal in the ADC circuit. By turning the potential switching signal (SW) at low-level at a time when the import of the signal level is completed, the potential applied to the gate of the transfer transistor 105 is switched to the second potential (−2 V) (t10). The subsequent operation is the same as the driving in the conventional example.

Figure 5:
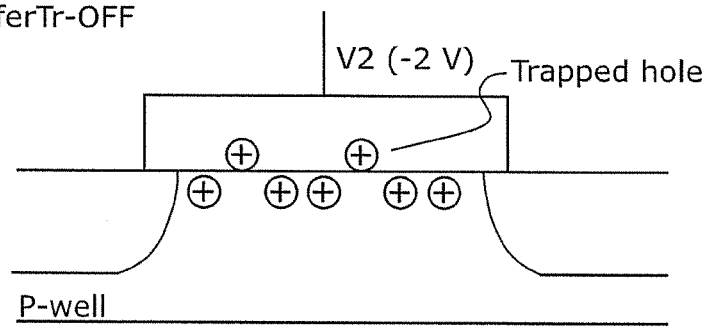
FIG. 5 shows a schematic diagram showing movement of charges near the interface under the gate of the transfer transistor in the solid-state imaging device according to embodiments of the present invention.
Figure 5:
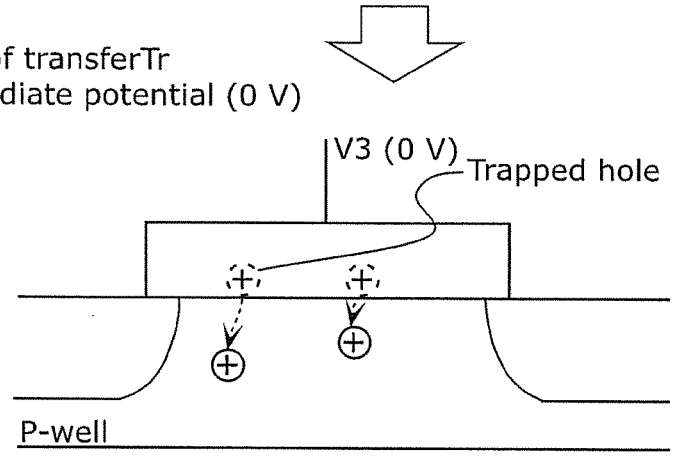
Figure 5:
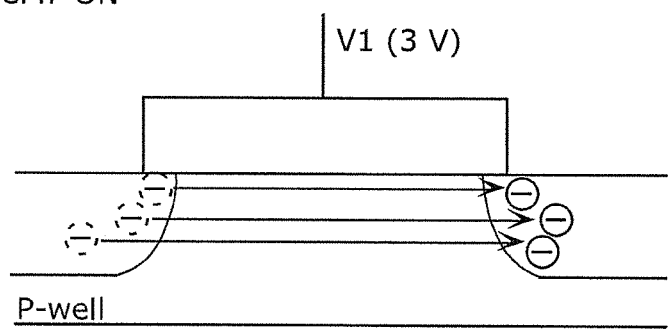

As described above using the drawings, in the solid-state imaging device and the method of driving the same according to the present embodiment, the holes trapped near the interface under the gate are emitted prior to the signal charge transfer ((b) in FIG. 5) by driving switching of the potential of the transfer signal from the second potential to the third potential prior to the signal charge transfer, and the photodiode (PD) 104 and the floating diffusion (FD) 107 are electrically insulated. After an optimal time has passed, the transfer transistor 105 is turned on to transfer the signal charges ((C) in FIG. 5).

The above optimal time to maintain the potential at the third potential is a time which satisfies being longer than the time constant for the emission of the holes trapped by the traps by which the holes are trapped, and is as short as possible. By setting the time to maintain the potential at the third potential longer than the time constant, the holes which have been near the interface under the gate, including the holes trapped by the traps, no longer exist. Therefore, a state is generated in which there is no charge loss which is caused by recoupling of the holes and the signal charges during the signal charge transfer. Furthermore, setting the time to maintain the third potential as short as possible provides an advantageous effect that the influence from the dark current and the white scratch through the surface trap is minimized. As a result, deterioration in image quality during a time with low-light-intensity can be prevented.

[Embodiment 2]

Embodiment 2 according to an aspect of the present invention is described with reference to the drawings. It is to be noted that the following description focuses on the difference from Embodiment 1, and other portions are the same as described in Embodiment 1.

In Embodiment 1, an example of a method of driving by applying three value potentials to the gate of the transfer transistor 105 in a scanning period of 1H that is the read row is described. However, as described above, it is desirable that the time in which the potential of the transfer signal is maintained at the third potential is the shortest time which satisfies being longer than the time constant for the emission of the holes from the traps by which the holes are trapped. If the time constant for the emission of the holes from the traps by which the holes are trapped is long, the driving for a period of 1H is may be insufficient for maintaining a sufficient time in which the potential of the transfer signal is maintained at the third potential. This is influenced by a clock frequency of a system to be used or a frame rate.

Therefore, the present embodiment has a feature that a potential of a gate of the transfer transistor 105 of the unit cell 103 is maintained at the third potential from a plurality of previous rows of the read row.

Figure 6A:
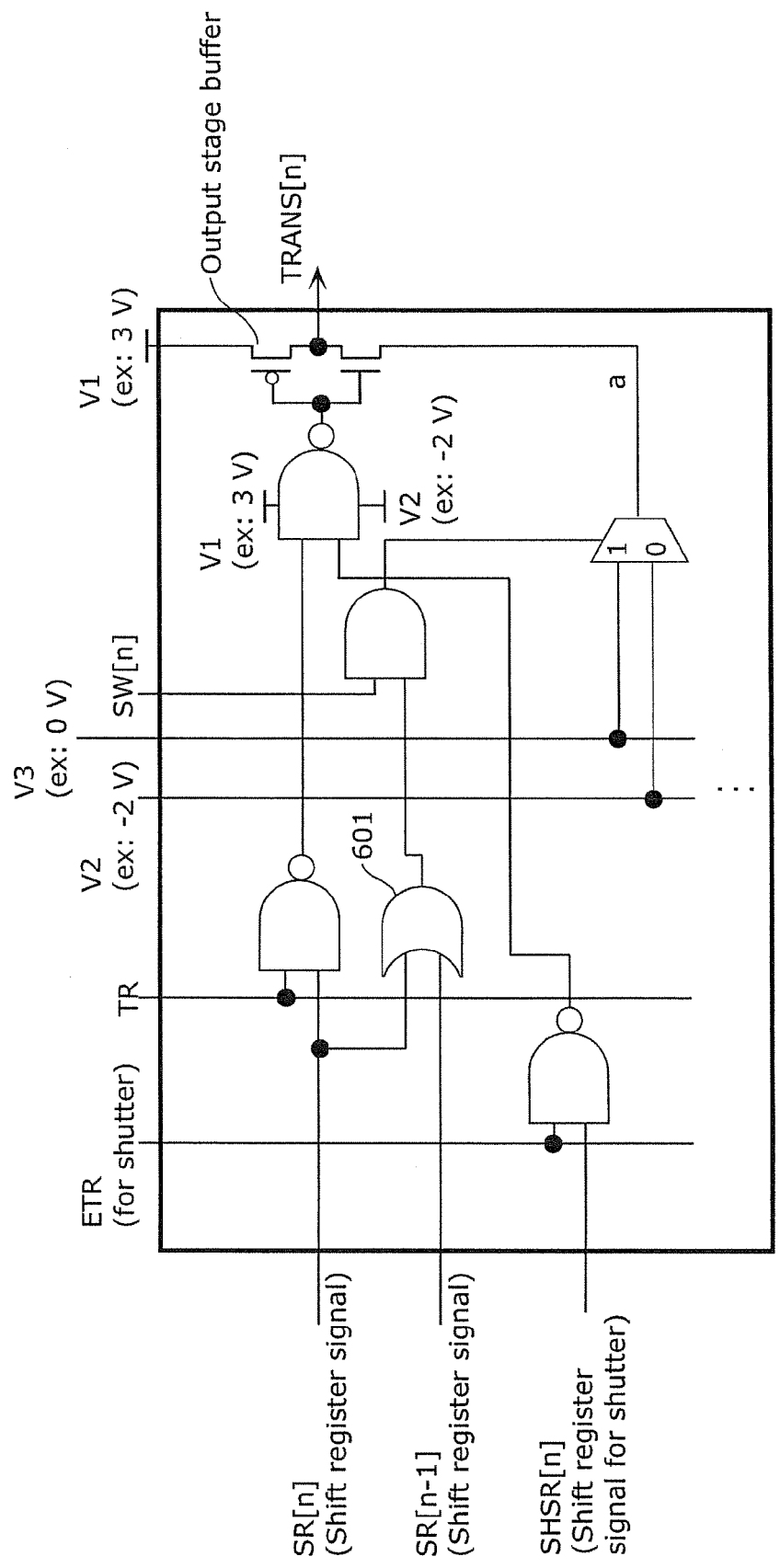
FIG. 6A shows a configuration example of the vertical scanning buffer according to Embodiment 2 of the present invention.

First, FIG. 6A shows a solid-state imaging device, a method of driving the same according to the present embodiment, and specifically a vertical scanning buffer circuit.

As shown in FIG. 6A, the first potential (3 V, for example), the second potential (−2 V, for example) and the third potential (0 V, for example) are applied to the vertical scanning buffer circuit. Furthermore, the signals to be inputted includes the shift register signal (SR[n]), the shift register signal for shutter (SHSR[n]), the transfer timing signal (TR), the transfer timing signal during shuttered period (ETR), and the potential switching signal (SW[n]). Furthermore, in the present embodiment, the shift register signal of an immediately previous row of the row (SR[n−1]) is inputted.

Figure 6B:
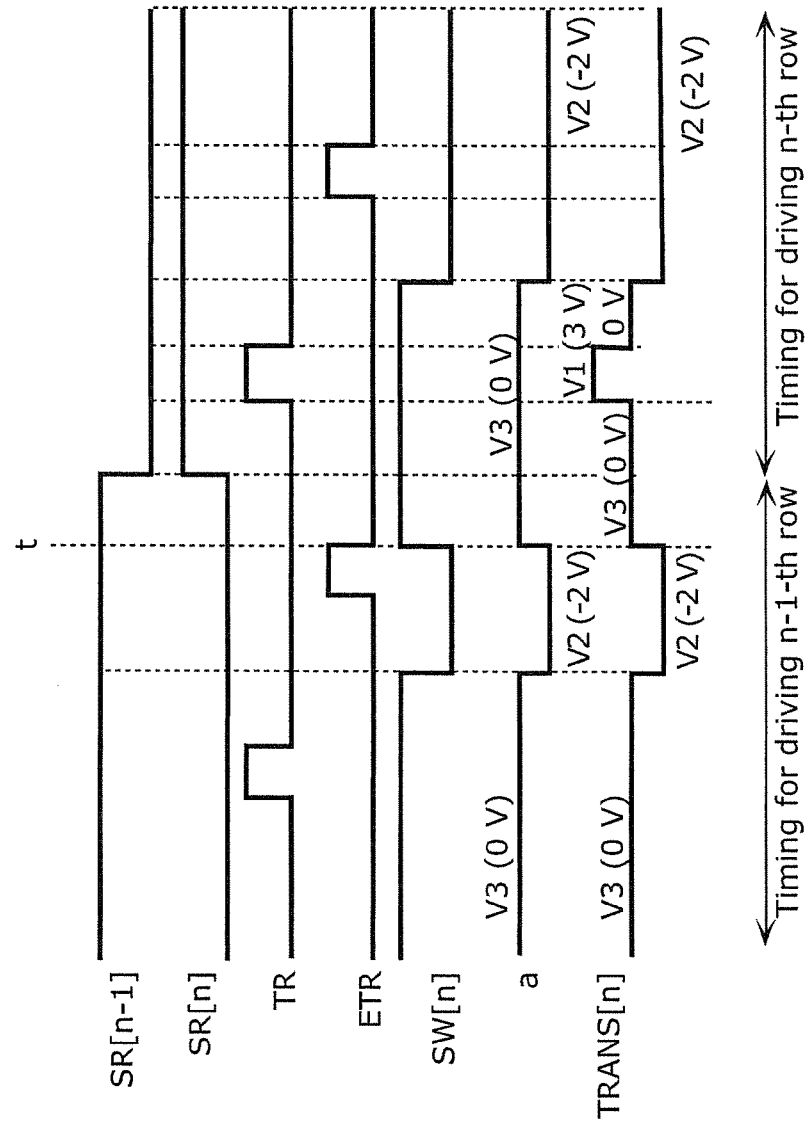
FIG. 6B shows driving timing of the vertical scanning buffer according to Embodiment 2 of the present invention.

Furthermore, FIG. 6B shows a driving (operation) of the vertical scanning buffer circuit. According to FIG. 6B, if the immediately previous row of the row is the read row, the shift register signal (SR[n]) of the row is low-level and the shift register signal of the immediately previous row of the row (SR[n−1]) is high-level. Therefore, if the potential switching signal (SW[n]) is high-level, a high-level signal is inputted to the multiplexer and the source (wiring a) of N-ch MOS of the output stage buffer is at the potential 3 (0 V, in the present embodiment). Therefore, the third potential (0 V) can be outputted from TRANS[n] of the row.

In the operation, including the shutter operation, of the vertical scanning buffer circuit at the row in the present embodiment, a pulse can be generated in the same manner as described in Embodiment 1.

Figure 6C:
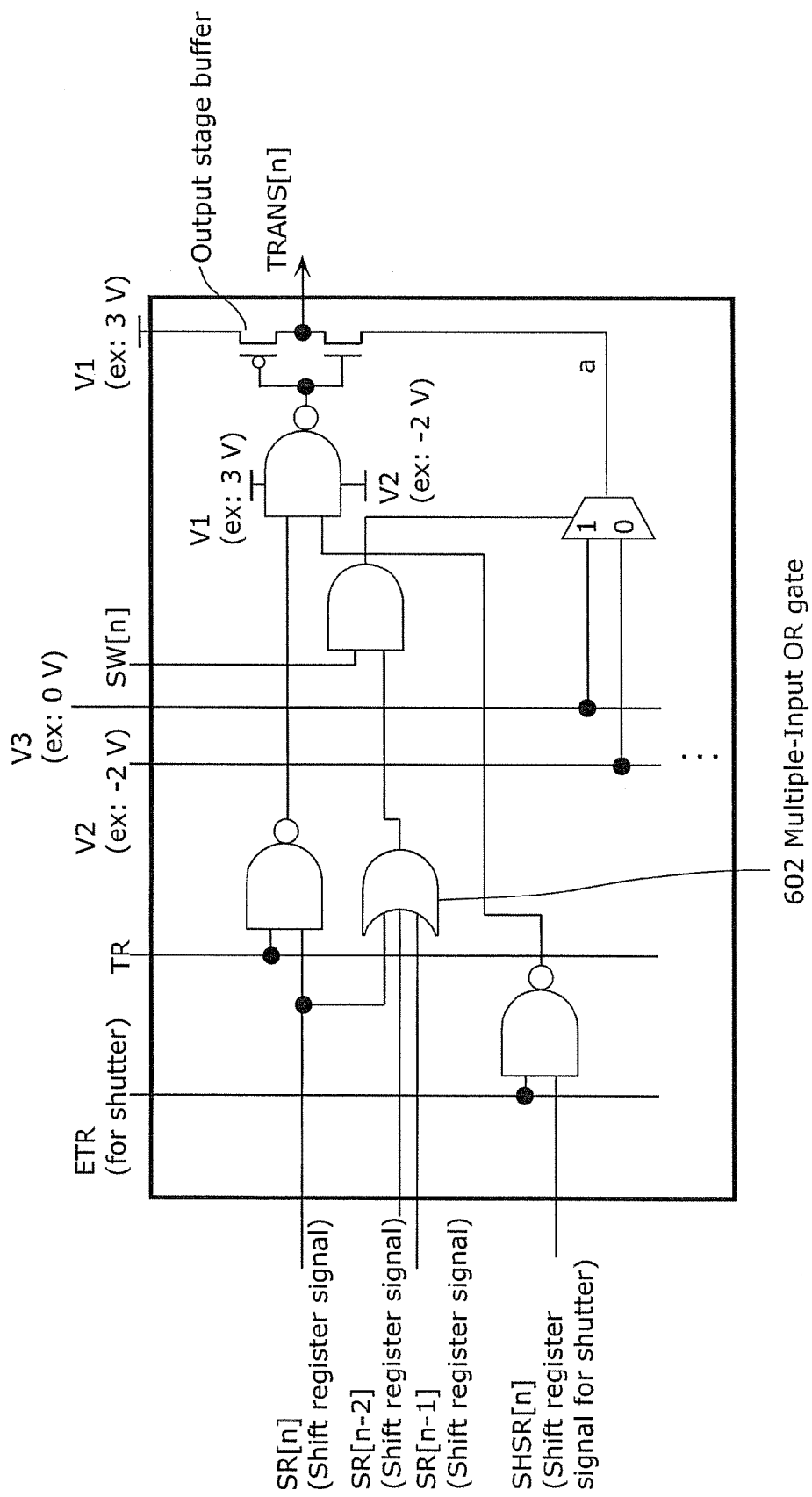
FIG. 6C shows another configuration example of the vertical scanning buffer according to Embodiment 2 of the present invention.

In FIG. 6A and FIG. 6B, the third potential is applied from an immediately previous row of the row for simplifying the description. However, in the present embodiment, by using a Multiple-Input OR gate 602 as shown in FIG. 6C and inputting the shift register signals for a plurality of rows (SR[n−1] and SR[n−2] in the drawing), the third potential can be outputted from TRANS[n] of the row at timing of driving of a secondly previous row of the row. Furthermore, by using more Multiple-Input OR gates 602, it is possible to support the time constant for the emission of the traps by which the holes are trapped in the semiconductor to be used.

Figure 7:
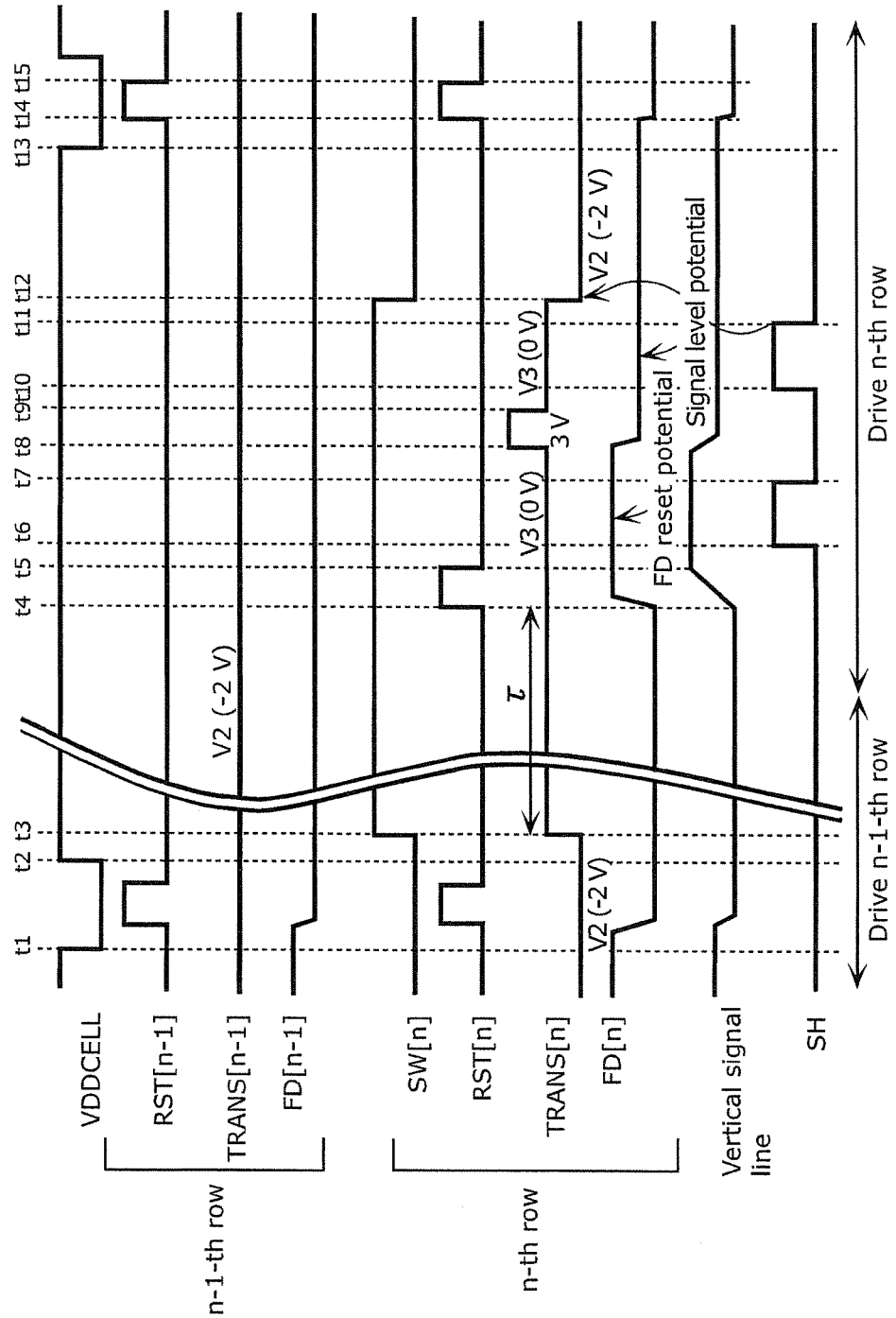
FIG. 7 shows a timing chart which shows a method of driving the solid-state imaging device according to Embodiment 2 of the present invention.

Next, FIG. 7 shows a timing chart which shows an operation of (method of driving) the solid-state imaging device according to the present embodiment.

As shown in FIG. 7, the period from t1 to t2 is a driving for turning the immediately previous row (n−1-th row) of the n-th row (the row) unselected, and the potential of the drain line (VDDCELL) 112 is decreased in order to set the floating diffusion (FD) 107 of the unit cell 103 at the n−1-th row at an unselected potential. Then, when a potential switching signal SW is turned into high-level at t3, the third potential (0 V) is outputted to the transfer gate line (TRANS [n]) 110 of the transfer transistor 105 at the n-th row during the driving of the n−1-th row by the vertical scanning buffer.

Then, the n-th row is driven and RST[n] is turned into high-level at the timing of t4. Therefore, the unit cell 103 at the n-th row is turned selected. Then, as described in Embodiment 1, the reset signal is sampled and held in the ADC circuit during the period from t6 to t7, the transfer gate line (TRANS [n]) 110 of the transfer transistor 105 is set at the first potential during the period from t8 to t9 to turn the transfer gate line (TRANS[n]) 110 of the transfer transistor 105 into ON state so that the signal charges are transferred, and the driving pulse SH is set at high-level during the period from t10 to t11 to sample and hold the signal. After the completion of the sample and hold, the potential switching signal (SW[n]) is turned into low-level to switch the gate of the transfer transistor 105 to the second potential (−2 V). The subsequent operation is the same as in Embodiment 1.

With the above operation, when the time constant for the emission of the holes from the traps by which the holes are trapped is longer than the driving of the n-th row, the holes are sufficiently emitted by setting the gate of the transfer transistor 105 at the n-th row at the third potential from the immediately previous row of the n-th row, so that the charge loss due to recoupling can be prevented. Therefore, it is possible to improve the image quality mainly in the time with low illumination.

Furthermore, although the potential applied to the gate of the transfer transistor 105 is switched to the third potential at the timing t3 in the present embodiment, the potential can be changed by switching the potential switching signal (SW[n]) at any timing in the driving of the n−1-th row.

Furthermore, by providing an OR gate 601 in the vertical scanning buffer circuit as shown in FIG. 6A, the potential to be applied to the gate of the transfer transistor 105 at the n-th row can be set at the third potential from a further previous row of the n-th row. Thus, a time constant for the emission of the traps by which the holes are trapped of any length can be supported.

[Embodiment 3]

Embodiment 3 according to an aspect of the present invention is described with reference to the drawings. It is to be noted that the subsequent description focuses on the difference from Embodiment 1, and other portions are the same as described in Embodiment 1 and Embodiment 2.

Figure 8:
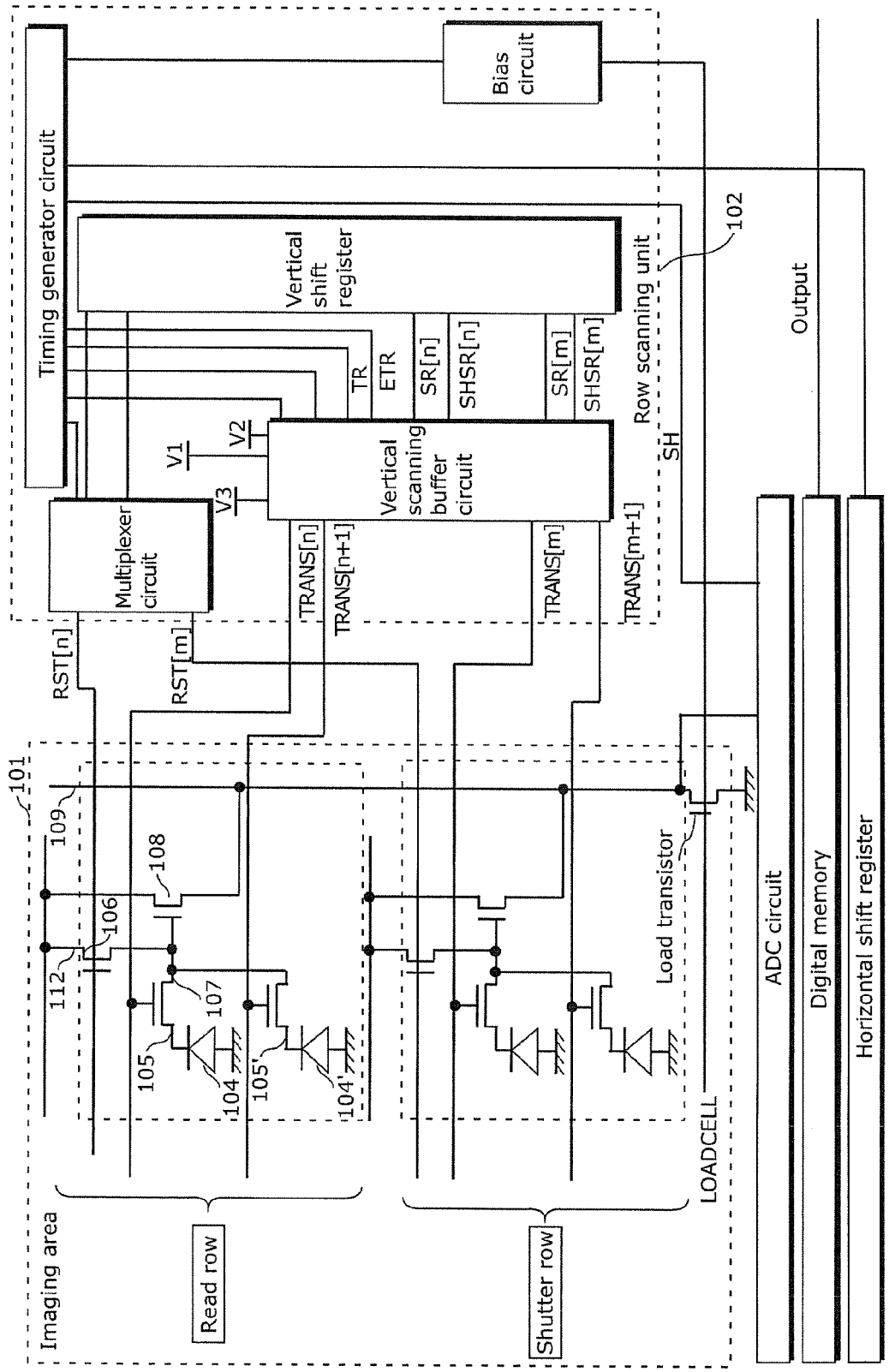
FIG. 8 shows an example of a peripheral circuit according to Embodiment 3 of the present invention.

As shown in FIG. 8, a unit cell in the present embodiment is configured with so-called a multipixel one-cell in which a plurality of transfer transistors 105 and photodiodes (PD) 104 are connected to one floating diffusion (FD) 107.

To be more specific, one of the electrodes of the transfer transistor 105 and one of the electrodes of the transfer transistor 105' are connected to the floating diffusion (FD) 107 in common. The other one of the electrodes of the transfer transistor 105 is connected to a cathode of the photodiode (PD) 104. The other one of the electrodes of the transfer transistor 105' is connected to a cathode of the photodiode (PD) 104'. Each of the gate of the transfer transistor 105 and the gate of the transfer transistor 105' is connected with a transfer gate line (TRANS) 110 to be connected to the vertical scanning buffer. A solid-state imaging device according to the present embodiment has a feature that the potentials of the three values are applied at this time for driving. The three value potentials are: the first potential which is a positive potential for turning on the transfer transistor; the second potential which is a negative potential for turning off the transfer transistor; and the third potential which is for not causing the pinning of the holes under the gate of the transfer transistor and turning off the transfer transistor. Although FIG. 8 shows the configuration in which two pixels are included in one cell for simplifying the description, a configuration in which further more pixels, such as four or eight pixels, are included in one cell may be used.

Furthermore, as to the driving timing, the timing stated in Embodiment 1 and Embodiment 2 can be used as it is. Thus, even in a solid-state imaging device configured with a multipixel one-cell, loss of signal charges due to recoupling of the signal charges and the holes trapped by the traps near the interface under the gate during the signal charge transfer is prevented, and the image quality in low light intensity is improved.

[Embodiment 4]

Figure 9:
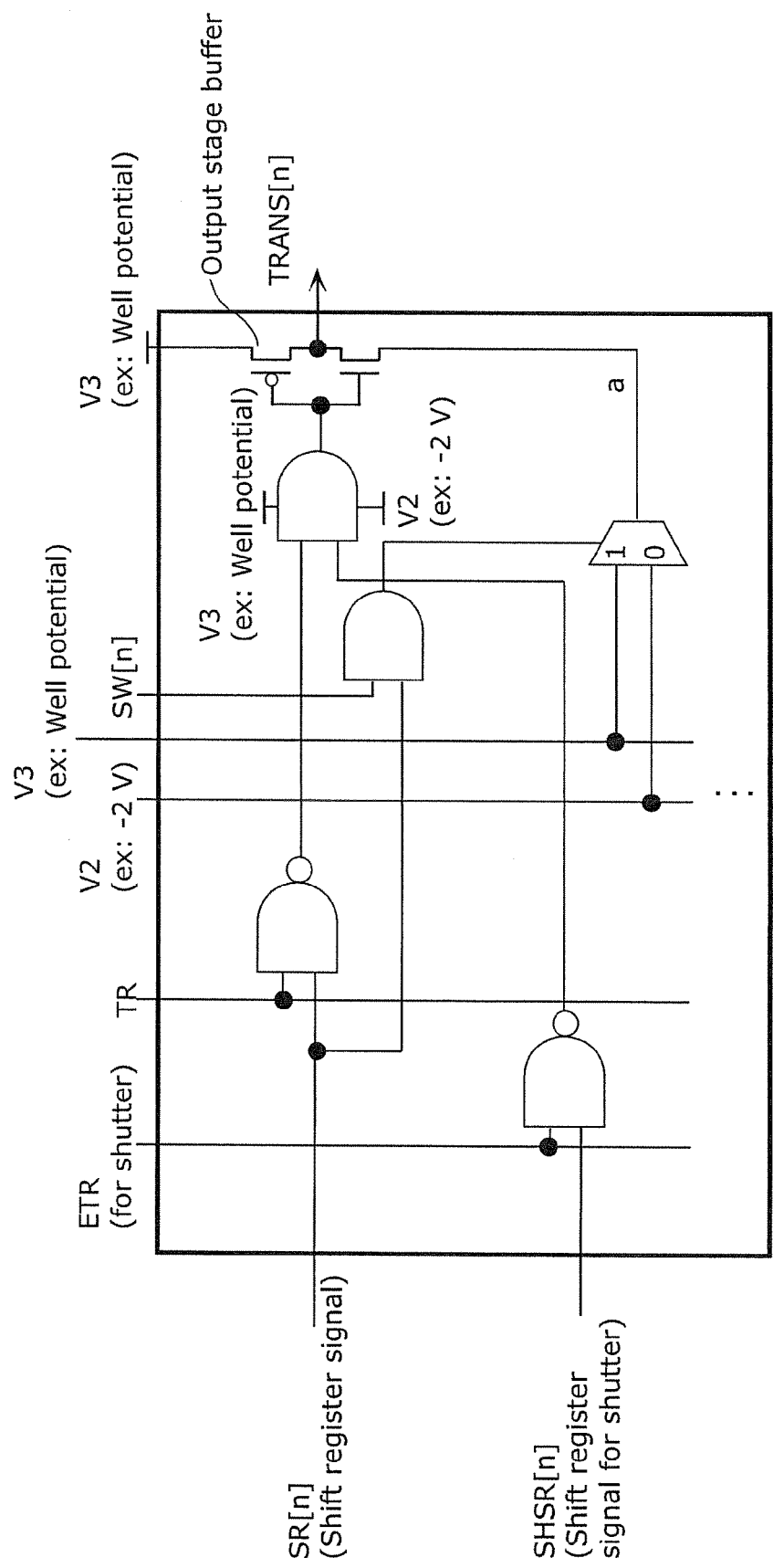
FIG. 9 shows a configuration example of a vertical scanning buffer circuit according to Embodiment 4 of the present invention.

In the present embodiment, the transfer transistor 105 is driven by three value pulses including: the first potential which is a positive potential (3 V); the second potential which is a negative potential (−2 V); and, as shown in FIG. 9, a potential equal to a well which constitutes the unit cell 103 on the semiconductor substrate as the third potential which is for not causing the pinning of the holes under the gate of the transfer transistor and turning off the transfer transistor.

As to how to achieve the present embodiment, for example, it is possible to easily achieve by shorting the wire shown in FIG. 2A which takes the potential 3 and the well potential. It can be easily achieved since a buck circuit is not required. As to the method of driving, it can be also operated by the same driving as described above. Thus, loss of signal charges due to recoupling of the signal charges and the holes trapped by the traps near the interface under the gate during the signal charge transfer is prevented, and the image quality in low light intensity is improved.

[Embodiment 5]

Figure 10:
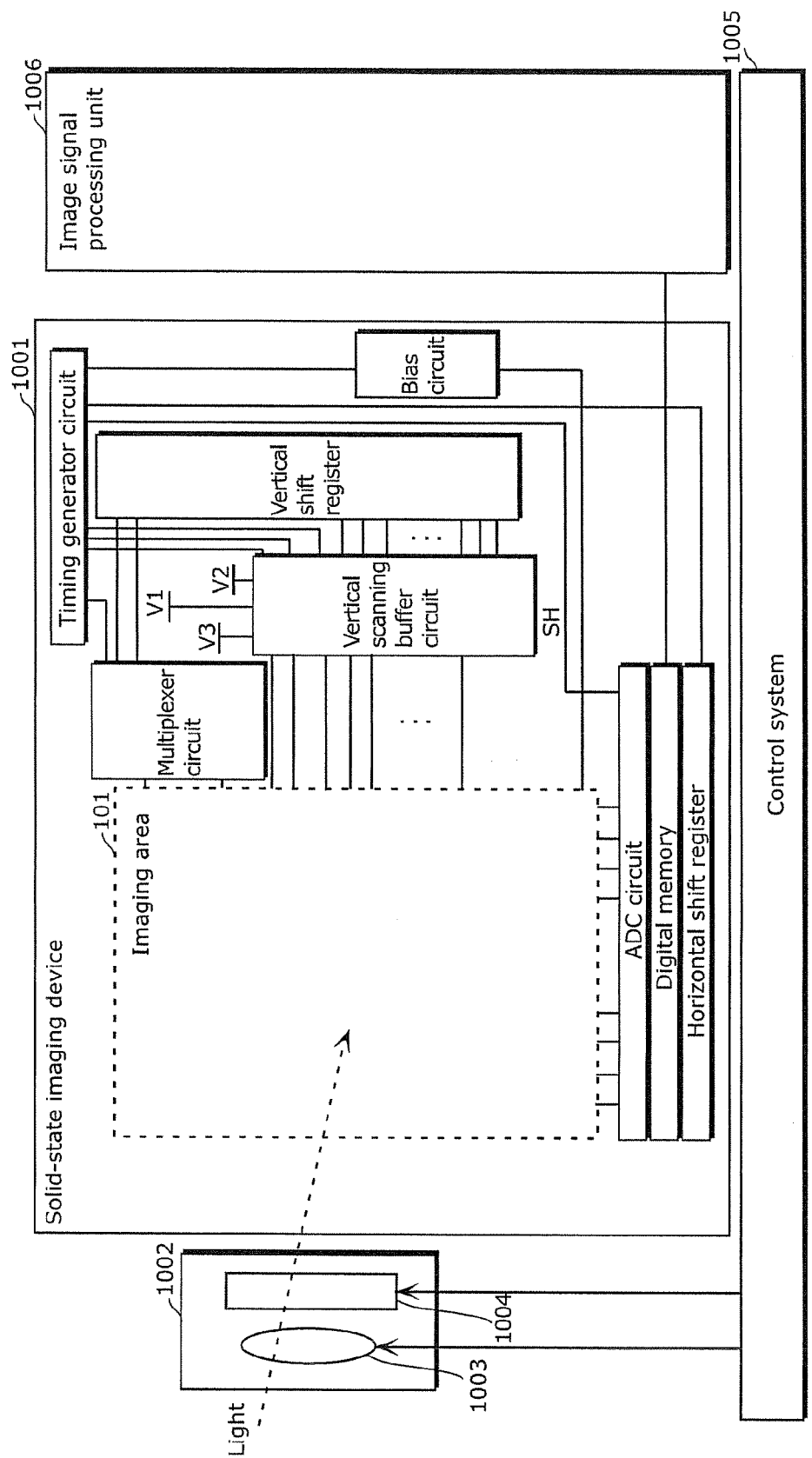
FIG. 10 shows an imaging device according to Embodiment 5 of the present invention.

Next, an imaging device according to an aspect of Embodiment 5 of the present invention is described with reference to FIG. 10. FIG. 10 is a block diagram showing a configuration of an imaging device (camera) according to the present embodiment.

As shown in FIG. 10, the imaging device represents a system which includes a camera module including: a solid-state imaging device 1001 according to Embodiments 1 to 4, as an imaging device; an optical system 1002 which forms an image light of an object on an imaging area 101 of the solid-state imaging device 1001; a lens 1003 and a shutter 1004 included in the optical system 1002; an image signal processing unit 1006 which processes an output signal from the solid-state imaging device 1001; and a control system 1005 which controls the entire device.

The lens 1003 forms the image of the object on the imaging area 101 of the solid-state imaging device 1001. The solid-state imaging device 1001 outputs an image signal obtained by converting the image of the object formed on an imaging surface by the lens 1003 into an electric signal pixel by pixel. The imaging device further includes an image signal processing unit 1006 which performs various signal processing on the image signal from the solid-state imaging device 1001.

The present embodiment provides an advantageous effect that when the solid-state imaging device described in the above-described present embodiment is used for an imaging device such as a video camera, a still camera, and even a camera module for mobile devices such as a mobile phone, the image quality of a captured image can be further improved since the loss of the signal charges due to recoupling of the signal charges and the holes trapped by the traps near the interface under the gate is suppressed.

COMPARISON EXAMPLE

The following describes a solid-state imaging device according to a comparison example between the embodiments of the present invention. Each of FIG. 11A and FIG. 11B shows a timing chart showing a method of driving the solid-state imaging device according to the comparison example between embodiments of the present invention.

Figure 11A:
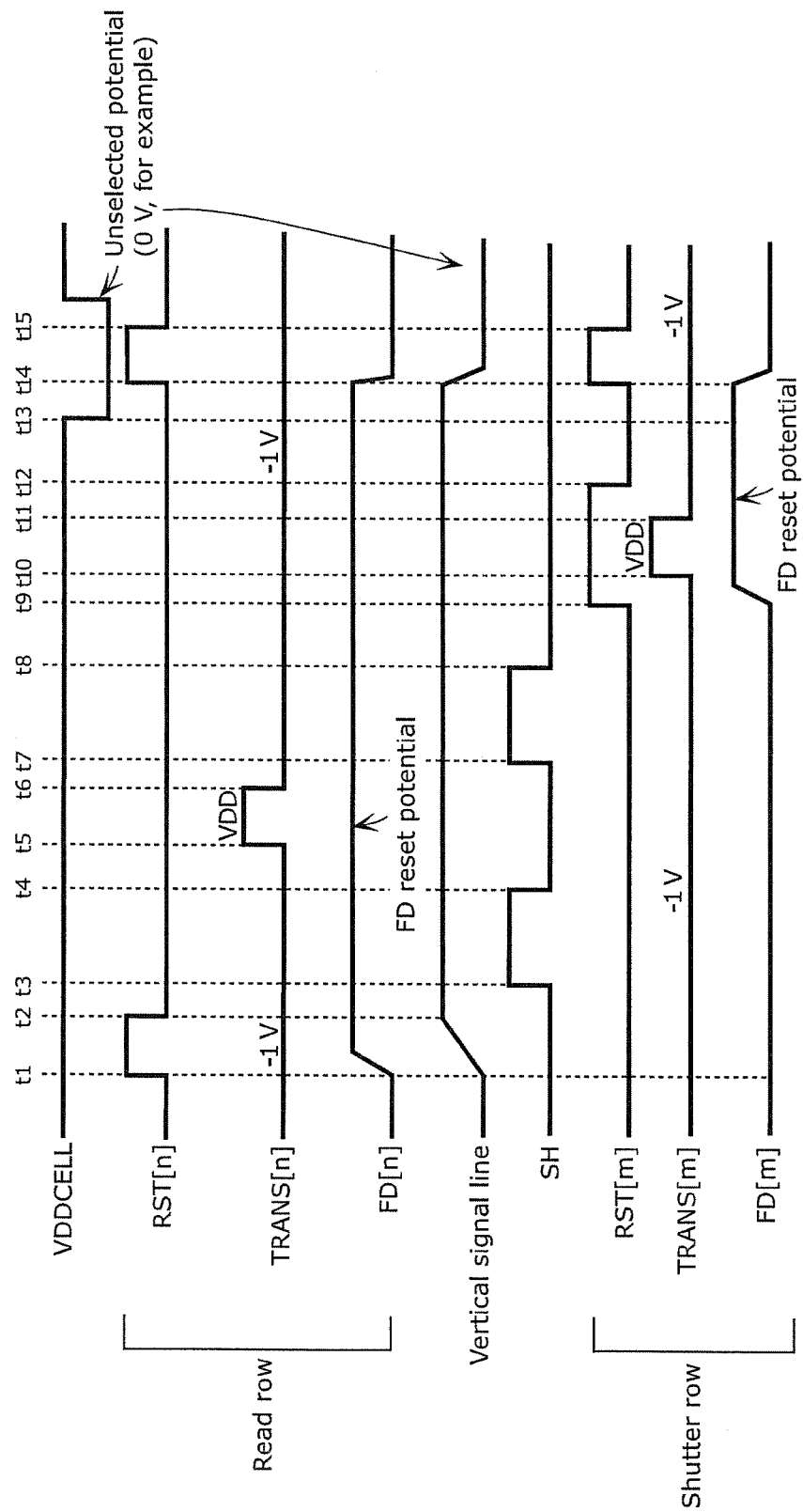
FIG. 11A shows a timing chart showing a method of driving the solid-state imaging device according to a comparison example between the embodiments of the present invention.
Figure 11B:
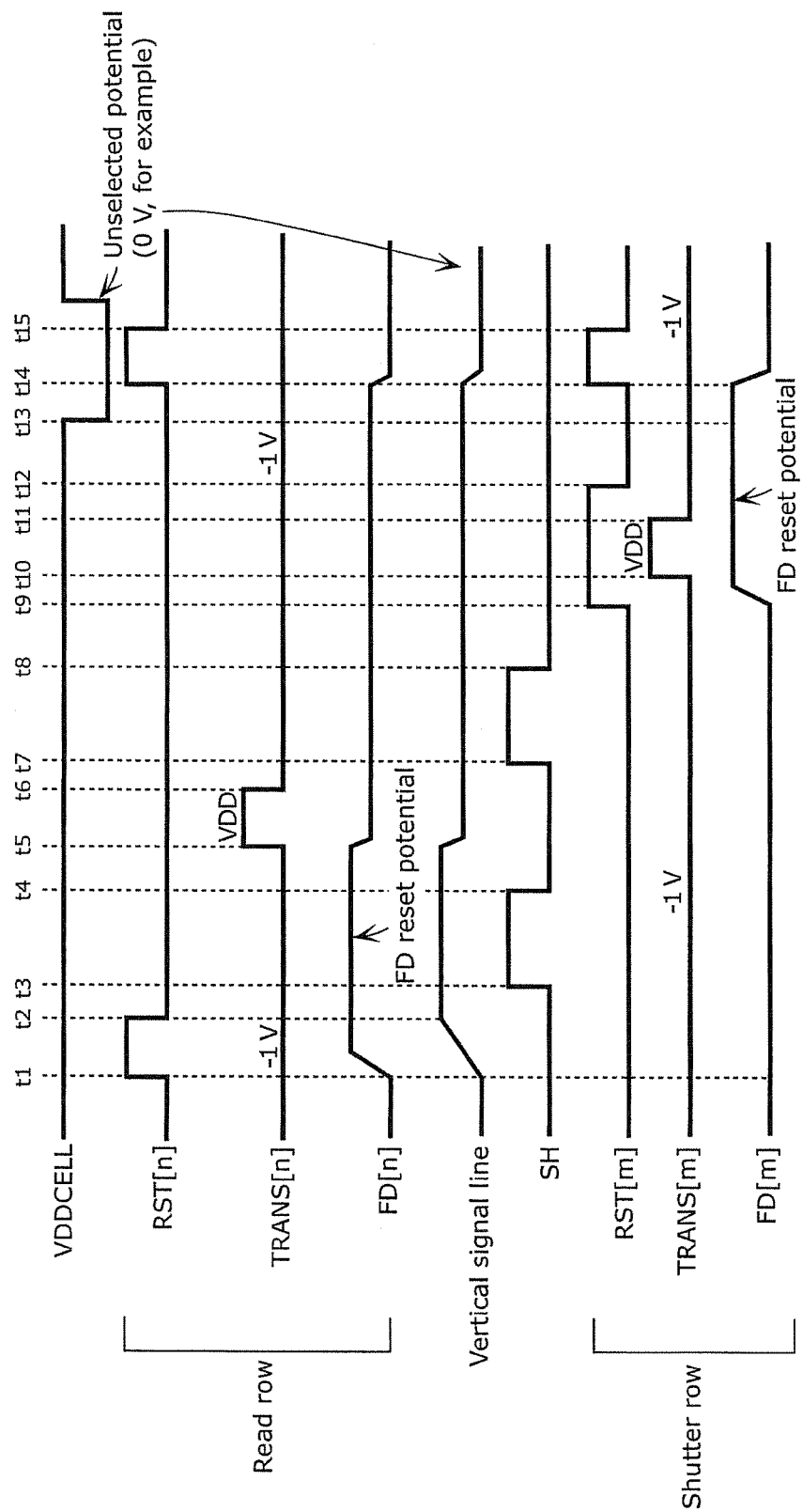
FIG. 11B shows a timing chart showing a method of driving the solid-state imaging device according to the comparison example between the embodiments of the present invention.

As shown in FIG. 11A, a constant voltage (3 V, for example) is first applied to a drain line (VDDCELL) 112, and a high-level driving pulse for driving the reset transistor 106 is applied to the reset line 111 (RST) in a state that the drain line (VDDCELL) 112 is at 3 V, then the reset transistor 106 turns into ON state, the potential of the floating diffusion (FD) 107 turns to be equal to the drain line (VDDCELL) 112, and the unit cell 103 turns into a selected state (t1).

Then, the reset transistor 106 which falls driving pulse to be applied to the reset line 111 is turned into OFF state (t2).

A potential decreased from the potential of the FD (FD reset potential=3 V) by a variation between a potential of the gate and a potential of the source (Vgs) of the amplifying transistor 108 is the reset signal of the column signal line 109. At this time, the driving pulse to be applied to the sample and hold line (SH) connected from the timing generator circuit to the ADC circuit is set at high-level to start importing of the reset signal of the column signal line 109 in the ADC circuit which is in the next stage and connected to the column signal line 109, and the driving pulse to be applied to the sample and hold line (SH) is turned into a low level, so that the sample and hold of the reset signal is completed (t3 to t4).

Next, a driving pulse TRANS is applied with a negative potential (−1 V, for example) until the timing of t5, and the transfer transistor 105 is in OFF state. Here, a high-level potential of a positive potential (3 V, for example) is applied to the transfer transistor 105 so that the transfer transistor 105 is turned into ON state (t5 to t6). At this time, when there is no incidence of light to and no signal charges (photoelectrons) are accumulated in the photodiode (PD) 104, the floating diffusion (FD) 107 does not change from the FD reset potential (FIG. 11A, after t5) even when the transfer transistor 105 is turned on.

In contrast, when there is incidence of light to and signal charges (photoelectrons) are accumulated in the photodiode (PD) 104, the signal charges (photoelectrons) are transferred from the photodiode (PD) 104 to the floating diffusion (FD) 107, the potential of the floating diffusion (FD) 107 is decreased depending on the signal charges (photoelectrons), and the potential (signal) of the column signal line 109 which is decreased from the FD potential by the variation in potential between the gate and the source (Vgs) of the amplifying transistor 108 is also decreased in correlation with the decrease (FIG. 11B, after t5). At this time, the driving pulse SH is set at high-level to import the potential (signal) of the column signal line 109 in ADC circuit in the next stage, and the difference between the reset signal and the signal, which are imported at timing of t4, is obtained and defined as the pixel signal (t7 to t8). Eventually, the pixel signal is converted into a digital value to be outputted from the solid-state imaging device.

At t13, the signal of the drain line (VDDCELL) falls. This potential is set as the unselected potential (0 V, for example). Then, the high-level driving pulse for driving the reset transistor 106 is applied to the gate of the reset transistor 106 so that the reset transistor 106 turns into ON state, the potential of the floating diffusion (FD) 107 turns to be equal to the potential of the drain line (VDDCELL) 112, namely the unselected potential, and the pixel turns into the unselected state (t14 to t15).

Meanwhile, in the shutter row, the high-level driving pulse for driving the reset transistor 106 is applied to the gate of the reset transistor 106 (t9). Then, the high-level driving pulse for driving the transfer transistor 105 is applied to the gate of the transfer transistor 105 (t10 to t11). In this state, the potential of the floating diffusion (FD) 107 does not change from the FD reset potential (3 V), since the reset transistor 106 in the shutter row is ON. After that, the reset line 111 falls.

Figure 12:
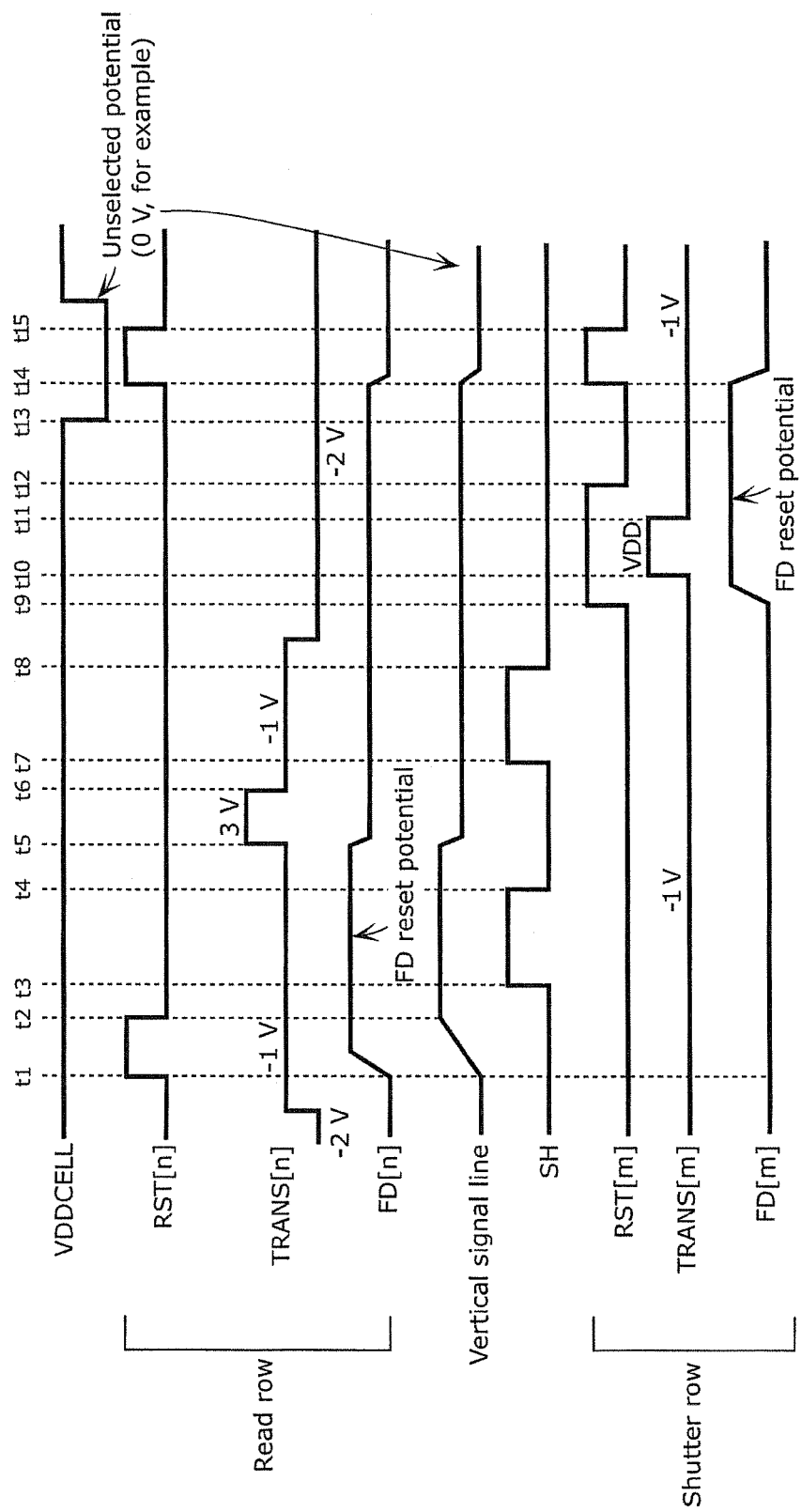
FIG. 12 shows a timing chart showing a method of driving the solid-state imaging device according to the comparison example between the embodiments of the present invention.

Furthermore, as shown in FIG. 12, simultaneously with or prior to the fall of the driving pulse RST (t2), the third potential (−1 V, for example), which is a negative potential and an intermediate potential of the first potential and the second potential, is applied to the gate of the transfer transistor 105. The first potential is a negative potential (−2 V, for example), and the second potential is a positive potential (3 V, for example) which turns the gate of the transfer transistor 105 into ON state.

Then, the first potential (3 V) is applied to the gate of the transfer transistor 105, the signal charges (photoelectrons) are transferred from the photodiode (PD) 104 to the floating diffusion (FD) 107 (FIGS. 12, t5 to t6), the third potential is applied to the gate of the transfer transistor 105, and the potential of the gate of the transfer transistor 105 is switched into the second potential after t8 at which the driving pulse SH falls.

Figure 13:
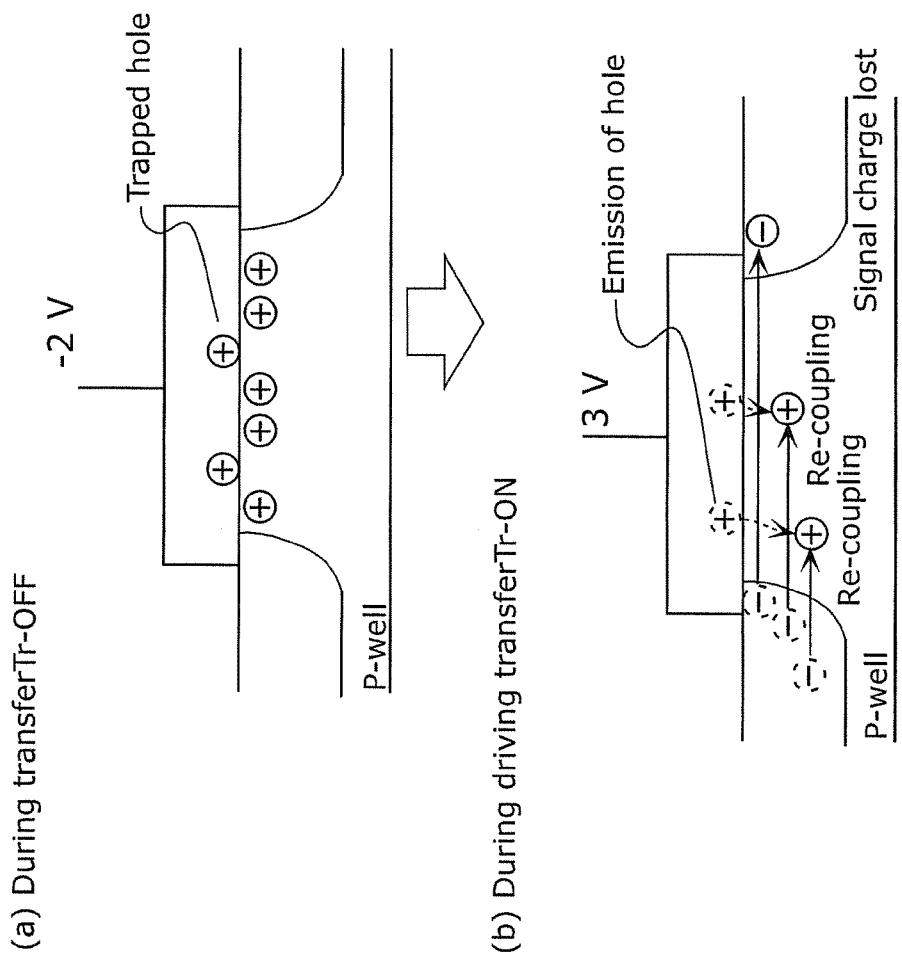
FIG. 13 shows a schematic diagram showing movement of charges near the interface under the gate of the transfer transistor in the solid-state imaging device according to the comparison example between the embodiments of the present invention.
Figure 14:
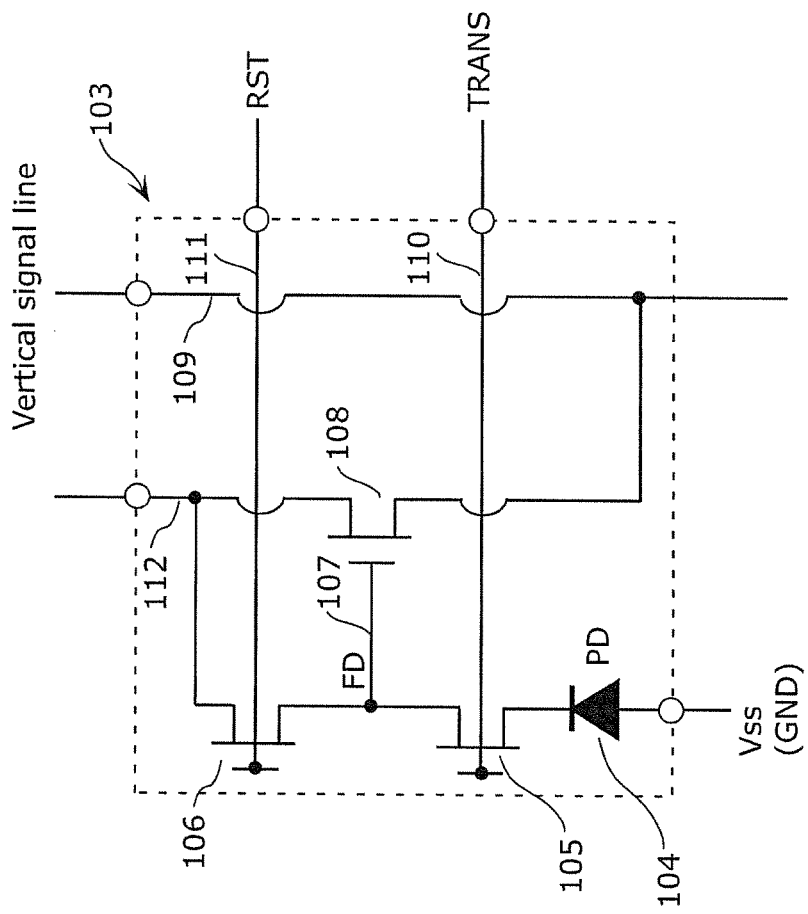
FIG. 14 shows a conventional technique.

However, with this operation, as shown in FIG. 13, when a negative potential (−2 V, for example) is applied to the gate of the transfer transistor 105 to turn off the transfer transistor 105, the holes are induced under the gate of the transfer transistor 105. As a result, the holes are trapped by the traps near the interface under the gate of the transfer transistor 105 ((a) in FIG. 13). When a positive potential (3 V, for example) is applied to the gate of the transfer transistor 105 to transfer the signal charges accumulated in the photodiode (PD) 104 to the floating diffusion (FD) 107, the transfer transistor 105 turns into ON state, a channel is formed under the gate, and the signal charges move from the photodiode (PD) 104 to the floating diffusion (FD) 107. Simultaneously with the movement, the signal charges vanish due to recoupling of the holes trapped by the traps near the interface under the gate and the signal charges moving though the channel ((b) in FIG. 13). Especially in an area with low light intensity where less signal charges are included, output is reduced which causes a problem that the linearity characteristics and the image quality are deteriorated.

As described above, the solid-state imaging device in each of the embodiments has the following features.

(a) The second potential V2 is a negative potential and the third potential V3 is a ground potential. Here, the third potential V3 may be equal to a potential of a well area in which the transfer transistor is formed.

(b) Each of the unit cells may be connected to the amplifying transistor and include a selection transistor which selects whether or not to output the voltage converted by the amplifying transistor to a column signal line (see FIG. 4).

(c) It is desirable that the row scanning unit is configured to change the potential of the transfer signal from the second potential (V2) to the third potential (V3) prior to a reset operation to reset the potential of the floating diffusion according to the reset signal.

If the potential of the transfer signal is changed from the second potential to the third potential during a time after the reset operation and before the transfer operation, the holes trapped by the traps near the interface under the gate may be emitted to the floating diffusion and the holes may become a noise source against a reset level.

With the above configuration, however, the noise against the reset level can be reduced since the holes trapped by the traps near the interface under the gate are emitted prior to the reset operation.

Here, it is desirable that timing for changing the potential of the transfer signal from the second potential to the third potential is in a minimum time which satisfies that a time after the change until the start of the reset operation is longer than a time constant during which the holes are emitted by the third potential.

(d) It is desirable that the row scanning unit is configured to change the potential of the transfer signal from the second potential (V2) to the third potential (V3) a predetermined time prior to a start of the reset operation. Here, the predetermined time is a minimum time which satisfies being longer than a time constant indicating a time required to emit the holes from traps under the gate of the transfer transistor. With this configuration, a sufficient amount of holes can be accurately emitted by setting the gate of the transfer transistor at the third potential for a time longer than the time constant in which the trapped holes are emitted from the traps. Therefore, the charge loss due to recoupling is reduced more accurately.

Furthermore, when the time constant during which the trapped holes are emitted from the traps is longer than the driving time of an n-th row, the gate of the transfer transistor of the n-th row is set at the third potential from an n−1-th row so that the sufficient amount of holes can be accurately emitted. Therefore, the charge loss due to recoupling is reduced more accurately. Thus, it is possible to improve the image quality mainly during a time with low light intensity. Furthermore, by setting the time to maintain the potential of the transfer signal at the third potential as short as possible with satisfying the time being longer than the time constant representing the time required to emit the holes from the traps under the gate of the transfer transistor 105, deterioration in image quality due to the dark current or the white scratch can be suppressed.

(e) The solid-state imaging device may further include a sample and hold unit configured to sample and hold, for every column of the unit cells, the voltage outputted from the amplifying transistor. The row scanning unit may hold the second potential from a completion of the transfer operation to a completion of the sample and hold, and change the potential of the transfer signal from the second potential to the third potential after the completion of the sample and hold. With this configuration, a signal is maintained to be in a same phase as the reset signal by maintaining the state of the floating diffusion during read-time in the same state as in the reset operation. Therefore, it is expected that the noise content unique to the semiconductor element is eliminated.

(f) The solid-state imaging device may further include an AD conversion unit configured to perform analog-to-digital (AD) conversion, for every column of the unit cells, on the voltage outputted from the amplifying transistor. The row scanning unit may hold the second potential from the completion of the transfer operation to the completion of the AD conversion, and change the potential of the transfer signal from the second potential to the third potential after the completion of the AD conversion. With this configuration, a signal is maintained to be in a same phase as the reset signal by maintaining the state of the floating diffusion during read-time in the same state as in the reset operation. Therefore, it is expected that the noise content unique to the semiconductor element is eliminated.

(g) Furthermore, a method of driving a solid-state imaging device, which includes: a plurality of unit cells 103 arranged in rows and columns; and a row scanning unit 102 which generates a reset signal and a transfer signal for driving row scanning of the unit cells 103, includes: changing a potential of the transfer signal from a second potential (V2) to a third potential (V3) in the row scanning; and supplying a transfer pulse having a first potential (V1) for causing a transfer of the signal charges from the photodiode to the floating diffusion in the row scanning.

(h) Furthermore, the imaging device (camera) in the embodiments of the present invention includes the above solid-state imaging device.

(i) It is to be noted that the solid-state imaging device according to the present invention is not determined by the above embodiments. Furthermore, other embodiments achieved by combining arbitrary constituents in the above embodiment, modification examples obtained by applying various modifications conceived by those skilled in the art to the above embodiment within a scope that does not deviate from the spirit of the present invention, and various devices including the solid-state imaging device according to the present invention is also included in the present invention.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The solid-state imaging device and the camera according to the present invention is useful in use for a digital still camera, a video camera, a car-mounted camera, a surveillance camera, and a camera for medical use.

The invention claimed is:
1. A solid-state imaging device comprising:
a plurality of unit cells arranged in rows and columns; and
a row scanning unit configured to generate a reset signal and a transfer signal for driving row scanning of the plurality of unit cells, wherein:
each of the plurality of unit cells includes:
   a photodiode which converts incident light into signal charges;
   a floating diffusion which holds the signal charges;
   a transfer transistor which transfers the signal charges from the photodiode to the floating diffusion according to the transfer signal;
   a reset transistor which resets a potential of the floating diffusion according to the reset signal; and
   an amplifying transistor which converts the signal charges accumulated in the floating diffusion into voltage,
each of the plurality of unit cells has a read-out state, an unselected state and a shuttered state,
the row scanning unit is configured to, in the read-out state, perform a transfer operation for causing a transfer of the signal charges from the photodiode to the floating diffusion, by supplying a transfer pulse having a first potential,
the row scanning unit is further configured to change a potential of the transfer signal from a second potential to a third potential prior to the transfer operation and then change the potential of the transfer signal from the third potential to the first potential for the transfer operation,
the first potential is a positive potential for turning the transfer transistor into an ON state,
the second potential is a potential for causing pinning of holes under a gate of the transfer transistor and turning the transfer transistor into an OFF state, and the third potential is a potential for not causing the pinning of the holes under the gate of the transfer transistor and turning the transfer transistor into an OFF state, the third potential being lower than the first potential and higher than the second potential.

2. The solid-state imaging device according to claim 1, wherein the second potential is a negative potential and the third potential is a ground potential.

3. The solid-state imaging device according to claim 1, wherein each of the plurality of unit cells is connected to the amplifying transistor and includes a selection transistor which selects whether or not to output the voltage converted by the amplifying transistor to a column signal line.

4. The solid-state imaging device according to claim 1, wherein the third potential is equal to a potential of a well area in which the transfer transistor is formed.

5. The solid-state imaging device according to claim 1, wherein the row scanning unit is configured to change, in the read-out state, the potential of the transfer signal from the second potential to the third potential prior to a reset operation to reset the potential of the floating diffusion according to the reset signal.

6. The solid-state imaging device according to claim 5, wherein the row scanning unit is configured to change, in the read-out state, the potential of the transfer signal from the second potential to the third potential a predetermined time prior to a start of the reset operation, and the predetermined time is longer than a time constant indicating a time required to emit the holes from traps under the gate of the transfer transistor.

7. The solid-state imaging device according to claim 1, further comprising
a sample and hold unit configured to perform a sample and hold operation for sampling and holding, for every column of the plurality of unit cells, the voltage outputted from the amplifying transistor,
wherein the row scanning unit is configured to hold the third potential from the completion of the transfer operation to a completion of the sample and hold operation, and to change the potential of the transfer signal from the third potential to the second potential after the completion of the sample and hold operation.

8. The solid-state imaging device according to claim 1, further comprising
an AD conversion unit configured to perform analog-to-digital (AD) conversion, for every column of the plurality of unit cells, on the voltage outputted from the amplifying transistor,
wherein the row scanning unit is configured to hold the third potential from the completion of the transfer operation to a completion of the AD conversion, and to change the potential of the transfer signal from the third potential to the second potential after the completion of the AD conversion.

9. A method of driving a solid-state imaging device which includes:
a plurality of unit cells arranged in rows and columns; and
a row scanning unit which generates a reset signal and a transfer signal for driving row scanning of the plurality of unit cells,
wherein each of the plurality of unit cells includes:
a photodiode which converts incident light into signal charges;
a floating diffusion which holds the signal charges;
a transfer transistor which transfers the signal charges from the photodiode to the floating diffusion according to the transfer signal;
a reset transistor which resets a potential of the floating diffusion according to the reset signal; and
an amplifying transistor which converts the signal charges accumulated in the floating diffusion into voltage, and
each of the plurality of unit cells has a read-out state, an unselected state and a shuttered state,
the method comprising:
in the read-out state, changing a potential of the transfer signal from a second potential to a third potential in the row scanning prior to a transfer operation; and
in the read-out state, changing the potential of the transfer signal from the third potential to a first potential for the transfer operation for causing a transfer of the signal charges from the photodiode to the floating diffusion in the row scanning,
wherein the first potential is a positive potential for turning the transfer transistor into an ON state,
the second potential is a potential for causing pinning of holes under the gate of the transfer transistor and turning the transfer transistor into an OFF state, and
the third potential is a potential for not causing the pinning of the holes under the gate of the transfer transistor and turning the transfer transistor into an OFF state, the third potential being lower than the first potential and higher than the second potential.

10. A camera comprising the solid-state imaging device according to claim 1.

11. The solid-state imaging device according to claim 1, wherein the row scanning unit is configured to supply the second potential during the read-out state except for a period until an import of a signal level has completed after a completion of the transfer operation, the unselected state, and the shuttered state except for a period for resetting the signal charges.

12. The method of claim 9, wherein the method further comprises supplying the second potential during the read-out state except for a period until an import of a signal level has completed after a completion of the transfer operation, the unselected state, and the shuttered state except for a period for resetting the signal charges.

* * * * *